(12) United States Patent
Hashirano

(10) Patent No.: US 6,844,830 B2
(45) Date of Patent: Jan. 18, 2005

(54) TWO-DIMENSIONAL SUBBAND CODING EQUIPMENT

(75) Inventor: Keigo Hashirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 57 days.

(21) Appl. No.: 10/406,717

(22) Filed: Apr. 3, 2003

(65) Prior Publication Data

US 2004/0021587 A1 Feb. 5, 2004

(30) Foreign Application Priority Data

Apr. 5, 2002 (JP) ........................................ 2002-104414

(51) Int. Cl.[7] .............................................. H03M 7/00

(52) U.S. Cl. ...................................................... 341/50

(58) Field of Search ............................. 341/50; 704/220, 704/205

(56) References Cited

U.S. PATENT DOCUMENTS 6,058,361 A * 5/2000 Mainard ..................... 704/220

* cited by examiner

*Primary Examiner*—Brian Young
(74) *Attorney, Agent, or Firm*—Frommer Lawrence & Haug LLP; William S. Frommer

(57) ABSTRACT

A two-dimensional wavelet transformer (10) includes a vertical wavelet transform block (11) and horizontal wavelet transform block (12). The vertical wavelet transform block (11) is supplied with original image data P such that a data string of vertical low-frequency band coefficients (L coefficients) and a data string of vertical high-frequency band coefficients (H coefficients) will be sequentially outputted horizontally from the vertical wavelet transform block (11). The horizontal wavelet transform block (12) is supplied with the L and H coefficients in the output sequence of the vertical wavelet transform block (11), namely, in the horizontal direction. Also, the horizontal wavelet transform block (12) transforms the L and H coefficients alternately. Therefore, the two-dimensional wavelet transformer (10) can work with less memory capacity and in a reduced time.

4 Claims, 26 Drawing Sheets

| $P^1_1$ | $P^1_2$ | $P^1_3$ | $P^1_4$ | $P^1_5$ | $P^1_6$ | | $P^1_{n-1}$ | $P^1_n$ |
|---|---|---|---|---|---|---|---|---|
| $P^2_1$ | $P^2_2$ | $P^2_3$ | $P^2_4$ | $P^2_5$ | $P^2_6$ | | $P^2_{n-1}$ | $P^2_n$ |
| $P^3_1$ | $P^3_2$ | $P^3_3$ | $P^3_4$ | $P^3_5$ | $P^3_6$ | | $P^3_{n-1}$ | $P^3_n$ |
| $P^4_1$ | $P^4_2$ | $P^4_3$ | $P^4_4$ | $P^4_5$ | $P^4_6$ | | $P^4_{n-1}$ | $P^4_n$ |
| $P^5_1$ | $P^5_2$ | $P^5_3$ | $P^5_4$ | $P^5_5$ | $P^5_6$ | | $P^5_{n-1}$ | $P^5_n$ |
| $P^6_1$ | $P^6_2$ | $P^6_3$ | $P^6_4$ | $P^6_5$ | $P^6_6$ | | $P^6_{n-1}$ | $P^6_n$ |
| | | | | | | | | |
| $P^{m-1}_1$ | $P^{m-1}_2$ | $P^{m-1}_3$ | $P^{m-1}_4$ | $P^{m-1}_5$ | $P^{m-1}_6$ | | $P^{m-1}_{n-1}$ | $P^{m-1}_n$ |
| $P^m_1$ | $P^m_2$ | $P^m_3$ | $P^m_4$ | $P^m_5$ | $P^m_6$ | | $P^m_{n-1}$ | $P^m_n$ |

FIG.5

| $L^1_1$ | $L^1_2$ | $L^1_3$ | $L^1_4$ | $L^1_5$ | $L^1_6$ | | $L^1_{n-1}$ | $L^1_n$ |
|---|---|---|---|---|---|---|---|---|
| $L^3_1$ | $L^3_2$ | $L^3_3$ | $L^3_4$ | $L^3_5$ | $L^3_6$ | | $L^3_{n-1}$ | $L^3_n$ |
| $L^5_1$ | $L^5_2$ | $L^5_3$ | $L^5_4$ | $L^5_5$ | $L^5_6$ | | $L^5_{n-1}$ | $L^5_n$ |
| | | | | | | | | |
| $L^{m-1}_1$ | $L^{m-1}_2$ | $L^{m-1}_3$ | $L^{m-1}_4$ | $L^{m-1}_5$ | $L^{m-1}_6$ | | $L^{m-1}_{n-1}$ | $L^{m-1}_n$ |
| $H^2_1$ | $H^2_2$ | $H^2_3$ | $H^2_4$ | $H^2_5$ | $H^2_6$ | | $H^2_{n-1}$ | $H^2_n$ |
| $H^4_1$ | $H^4_2$ | $H^4_3$ | $H^4_4$ | $H^4_5$ | $H^4_6$ | | $H^4_{n-1}$ | $H^4_n$ |
| $H^6_1$ | $H^6_2$ | $H^6_3$ | $H^6_4$ | $H^6_5$ | $H^6_6$ | | $H^6_{n-1}$ | $H^6_n$ |
| | | | | | | | | |
| $H^m_1$ | $H^m_2$ | $H^m_3$ | $H^m_4$ | $H^m_5$ | $H^m_6$ | | $H^m_{n-1}$ | $H^m_n$ |

FIG.6

| $LL^1_1$ | $LL^1_3$ | $LL^1_5$ | | $LL^1_{n-1}$ | $HL^1_2$ | $HL^1_4$ | $HL^1_6$ | | $HL^1_n$ |
|---|---|---|---|---|---|---|---|---|---|
| $LL^3_1$ | $LL^3_3$ | $LL^3_5$ | | $LL^3_{n-1}$ | $HL^3_2$ | $HL^3_4$ | $HL^3_6$ | | $HL^3_n$ |
| $LL^5_1$ | $LL^5_3$ | $LL^5_5$ | | $LL^5_{n-1}$ | $HL^5_2$ | $HL^5_4$ | $HL^5_6$ | | $HL^5_n$ |
| | | | | | | | | | |
| $LL^{m-1}_1$ | $LL^{m-1}_3$ | $LL^{m-1}_5$ | | $LL^{m-1}_{n-1}$ | $HL^{m-1}_2$ | $HL^{m-1}_4$ | $HL^{m-1}_6$ | | $HL^{m-1}_n$ |
| $LH^2_1$ | $LH^2_3$ | $LH^2_5$ | | $LH^2_{n-1}$ | $HH^2_2$ | $HH^2_4$ | $HH^2_6$ | | $HH^2_n$ |
| $LH^4_1$ | $LH^4_3$ | $LH^4_5$ | | $LH^4_{n-1}$ | $HH^4_2$ | $HH^4_4$ | $HH^4_6$ | | $HH^4_n$ |
| $LH^6_1$ | $LH^6_3$ | $LH^6_5$ | | $LH^6_{n-1}$ | $HH^6_2$ | $HH^6_4$ | $HH^6_6$ | | $HH^6_n$ |
| | | | | | | | | | |
| $LH^m_1$ | $LH^m_3$ | $LH^m_5$ | | $LH^m_{n-1}$ | $HH^m_2$ | $HH^m_4$ | $HH^m_6$ | | $HH^m_n$ |

FIG. 7

| | | | | | | | | | |
|---|---|---|---|---|---|---|---|---|---|
| $I_1 \leftarrow$ | $P^1_1$ | $P^1_2$ | $P^1_3$ | $P^1_4$ | $P^1_5$ | $P^1_6$ | | $P^1_{n-1}$ | $P^1_n$ |
| $I_2 \leftarrow$ | $P^2_1$ | $P^2_2$ | $P^2_3$ | $P^2_4$ | $P^2_5$ | $P^2_6$ | | $P^2_{n-1}$ | $P^2_n$ |
| $I_3 \leftarrow$ | $P^3_1$ | $P^3_2$ | $P^3_3$ | $P^3_4$ | $P^3_5$ | $P^3_6$ | | $P^3_{n-1}$ | $P^3_n$ |
| | $P^4_1$ | $P^4_2$ | $P^4_3$ | $P^4_4$ | $P^4_5$ | $P^4_6$ | | $P^4_{n-1}$ | $P^4_n$ |
| | $P^5_1$ | $P^5_2$ | $P^5_3$ | $P^5_4$ | $P^5_5$ | $P^5_6$ | | $P^5_{n-1}$ | $P^5_n$ |
| | $P^6_1$ | $P^6_2$ | $P^6_3$ | $P^6_4$ | $P^6_5$ | $P^6_6$ | | $P^6_{n-1}$ | $P^6_n$ |
| | | | | | | | | | |
| | $P^{m-1}_1$ | $P^{m-1}_2$ | $P^{m-1}_3$ | $P^{m-1}_4$ | $P^{m-1}_5$ | $P^{m-1}_6$ | | $P^{m-1}_{n-1}$ | $P^{m-1}_n$ |
| | $P^m_1$ | $P^m_2$ | $P^m_3$ | $P^m_4$ | $P^m_5$ | $P^m_6$ | | $P^m_{n-1}$ | $P^m_n$ |

FIG. 13

| $O_0 \rightarrow$ | $L^1_1$ | $L^1_2$ | $L^1_3$ | $L^1_4$ | $L^1_5$ | $L^1_6$ | | $L^1_{n-1}$ | $L^1_n$ |
|---|---|---|---|---|---|---|---|---|---|
| | $L^3_1$ | $L^3_2$ | $L^3_3$ | $L^3_4$ | $L^3_5$ | $L^3_6$ | | $L^3_{n-1}$ | $L^3_n$ |
| | $L^5_1$ | $L^5_2$ | $L^5_3$ | $L^5_4$ | $L^5_5$ | $L^5_6$ | | $L^5_{n-1}$ | $L^5_n$ |
| | | | | | | | | | |
| | $L^{m-1}_1$ | $L^{m-1}_2$ | $L^{m-1}_3$ | $L^{m-1}_4$ | $L^{m-1}_5$ | $L^{m-1}_6$ | | $L^{m-1}_{n-1}$ | $L^{m-1}_n$ |
| $O_1 \rightarrow$ | $H^2_1$ | $H^2_2$ | $H^2_3$ | $H^2_4$ | $H^2_5$ | $H^2_6$ | | $H^2_{n-1}$ | $H^2_n$ |
| | $H^4_1$ | $H^4_2$ | $H^4_3$ | $H^4_4$ | $H^4_5$ | $H^4_6$ | | $H^4_{n-1}$ | $H^4_n$ |
| | $H^6_1$ | $H^6_2$ | $H^6_3$ | $H^6_4$ | $H^6_5$ | $H^6_6$ | | $H^6_{n-1}$ | $H^6_n$ |
| | | | | | | | | | |
| | $H^m_1$ | $H^m_2$ | $H^m_3$ | $H^m_4$ | $H^m_5$ | $H^m_6$ | | $H^m_{n-1}$ | $H^m_n$ |

FIG. 14

| $P^1_1$ | $P^1_2$ | $P^1_3$ | $P^1_4$ | $P^1_5$ | $P^1_6$ | | $P^1_{n-1}$ | $P^1_n$ |
|---|---|---|---|---|---|---|---|---|
| $P^2_1$ | $P^2_2$ | $P^2_3$ | $P^2_4$ | $P^2_5$ | $P^2_6$ | | $P^2_{n-1}$ | $P^2_n$ |
| $P^3_1$ | $P^3_2$ | $P^3_3$ | $P^3_4$ | $P^3_5$ | $P^3_6$ | | $P^3_{n-1}$ | $P^3_n$ |
| $P^4_1$ | $P^4_2$ | $P^4_3$ | $P^4_4$ | $P^4_5$ | $P^4_6$ | | $P^4_{n-1}$ | $P^4_n$ |
| $P^5_1$ | $P^5_2$ | $P^5_3$ | $P^5_4$ | $P^5_5$ | $P^5_6$ | | $P^5_{n-1}$ | $P^5_n$ |
| $P^6_1$ | $P^6_2$ | $P^6_3$ | $P^6_4$ | $P^6_5$ | $P^6_6$ | | $P^6_{n-1}$ | $P^6_n$ |
| | | | | | | | | |
| $P^{m-1}_1$ | $P^{m-1}_2$ | $P^{m-1}_3$ | $P^{m-1}_4$ | $P^{m-1}_5$ | $P^{m-1}_6$ | | $P^{m-1}_{n-1}$ | $P^{m-1}_n$ |
| $P^m_1$ | $P^m_2$ | $P^m_3$ | $P^m_4$ | $P^m_5$ | $P^m_6$ | | $P^m_{n-1}$ | $P^m_n$ |

$I_1$ ← row 3, $I_2$ ← row 4, $I_3$ ← row 5

FIG. 15

| | | | | | | | | | |
|---|---|---|---|---|---|---|---|---|---|
| | $L^1_1$ | $L^1_2$ | $L^1_3$ | $L^1_4$ | $L^1_5$ | $L^1_6$ | | $L^1_{n-1}$ | $L^1_n$ |
| $O_0 \rightarrow$ | $L^3_1$ | $L^3_2$ | $L^3_3$ | $L^3_4$ | $L^3_5$ | $L^3_6$ | | $L^3_{n-1}$ | $L^3_n$ |
| | $L^5_1$ | $L^5_2$ | $L^5_3$ | $L^5_4$ | $L^5_5$ | $L^5_6$ | | $L^5_{n-1}$ | $L^5_n$ |
| | | | | | | | | | |
| | $L^{m-1}_1$ | $L^{m-1}_2$ | $L^{m-1}_3$ | $L^{m-1}_4$ | $L^{m-1}_5$ | $L^{m-1}_6$ | | $L^{m-1}_{n-1}$ | $L^{m-1}_n$ |
| | $H^2_1$ | $H^2_2$ | $H^2_3$ | $H^2_4$ | $H^2_5$ | $H^2_6$ | | $H^2_{n-1}$ | $H^2_n$ |
| $O_1 \rightarrow$ | $H^4_1$ | $H^4_2$ | $H^4_3$ | $H^4_4$ | $H^4_5$ | $H^4_6$ | | $H^4_{n-1}$ | $H^4_n$ |
| | $H^6_1$ | $H^6_2$ | $H^6_3$ | $H^6_4$ | $H^6_5$ | $H^6_6$ | | $H^6_{n-1}$ | $H^6_n$ |
| | | | | | | | | | |
| | $H^m_1$ | $H^m_2$ | $H^m_3$ | $H^m_4$ | $H^m_5$ | $H^m_6$ | | $H^m_{n-1}$ | $H^m_n$ |

FIG. 16

| $O_0$ ↑ | | | | | $O_1$ ↑ | | | | |
|---|---|---|---|---|---|---|---|---|---|
| $LL^1_1$ | $LL^1_3$ | $LL^1_5$ | | $LL^1_{n-1}$ | $HL^1_2$ | $HL^1_4$ | $HL^1_6$ | | $HL^1_n$ |
| $LL^3_1$ | $LL^3_3$ | $LL^3_5$ | | $LL^3_{n-1}$ | $HL^3_2$ | $HL^3_4$ | $HL^3_6$ | | $HL^3_n$ |
| $LL^5_1$ | $LL^5_3$ | $LL^5_5$ | | $LL^5_{n-1}$ | $HL^5_2$ | $HL^5_4$ | $HL^5_6$ | | $HL^5_n$ |
| | | | | | | | | | |
| $LL^{m-1}_1$ | $LL^{m-1}_3$ | $LL^{m-1}_5$ | | $LL^{m-1}_{n-1}$ | $HL^{m-1}_2$ | $HL^{m-1}_4$ | $HL^{m-1}_6$ | | $HL^{m-1}_n$ |
| $LH^2_1$ | $LH^2_3$ | $LH^2_5$ | | $LH^2_{n-1}$ | $HH^2_2$ | $HH^2_4$ | $HH^2_6$ | | $HH^2_n$ |
| $LH^4_1$ | $LH^4_3$ | $LH^4_5$ | | $LH^4_{n-1}$ | $HH^4_2$ | $HH^4_4$ | $HH^4_6$ | | $HH^4_n$ |
| $LH^6_1$ | $LH^6_3$ | $LH^6_5$ | | $LH^6_{n-1}$ | $HH^6_2$ | $HH^6_4$ | $HH^6_6$ | | $HH^6_n$ |
| | | | | | | | | | |
| $LH^m_1$ | $LH^m_3$ | $LH^m_5$ | | $LH^m_{n-1}$ | $HH^m_2$ | $HH^m_4$ | $HH^m_6$ | | $HH^m_n$ |

FIG. 19

| | | $I_1$ | $I_2$ | $I_3$ | | | | | |
|---|---|---|---|---|---|---|---|---|---|
| $L^1_1$ | $L^1_2$ | $L^1_3$ | $L^1_4$ | $L^1_5$ | $L^1_6$ | | | $L^1_{n-1}$ | $L^1_n$ |
| $L^3_1$ | $L^3_2$ | $L^3_3$ | $L^3_4$ | $L^3_5$ | $L^3_6$ | | | $L^3_{n-1}$ | $L^3_n$ |
| $L^5_1$ | $L^5_2$ | $L^5_3$ | $L^5_4$ | $L^5_5$ | $L^5_6$ | | | $L^5_{n-1}$ | $L^5_n$ |
| | | | | | | | | | |
| $L^{m-1}_1$ | $L^{m-1}_2$ | $L^{m-1}_3$ | $L^{m-1}_4$ | $L^{m-1}_5$ | $L^{m-1}_6$ | | | $L^{m-1}_{n-1}$ | $L^{m-1}_n$ |
| $H^2_1$ | $H^2_2$ | $H^2_3$ | $H^2_4$ | $H^2_5$ | $H^2_6$ | | | $H^2_{n-1}$ | $H^2_n$ |
| $H^4_1$ | $H^4_2$ | $H^4_3$ | $H^4_4$ | $H^4_5$ | $H^4_6$ | | | $H^4_{n-1}$ | $H^4_n$ |
| $H^6_1$ | $H^6_2$ | $H^6_3$ | $H^6_4$ | $H^6_5$ | $H^6_6$ | | | $H^6_{n-1}$ | $H^6_n$ |
| | | | | | | | | | |
| $H^m_1$ | $H^m_2$ | $H^m_3$ | $H^m_4$ | $H^m_5$ | $H^m_6$ | | | $H^m_{n-1}$ | $H^m_n$ |

FIG.20

| | | | | | | | | | |
|---|---|---|---|---|---|---|---|---|---|
| $LL^1_1$ | $LL^1_3$ | $LL^1_5$ | | $LL^1_{n-1}$ | $HL^1_2$ | $HL^1_4$ | $HL^1_6$ | | $HL^1_n$ |
| $LL^3_1$ | $LL^3_3$ | $LL^3_5$ | | $LL^3_{n-1}$ | $HL^3_2$ | $HL^3_4$ | $HL^3_6$ | | $HL^3_n$ |
| $LL^5_1$ | $LL^5_3$ | $LL^5_5$ | | $LL^5_{n-1}$ | $HL^5_2$ | $HL^5_4$ | $HL^5_6$ | | $HL^5_n$ |
| | | | | | | | | | |
| $LL^{m-1}_1$ | $LL^{m-1}_3$ | $LL^{m-1}_5$ | | $LL^{m-1}_{n-1}$ | $HL^{m-1}_2$ | $HL^{m-1}_4$ | $HL^{m-1}_6$ | | $HL^{m-1}_n$ |
| $LH^2_1$ | $LH^2_3$ | $LH^2_5$ | | $LH^2_{n-1}$ | $HH^2_2$ | $HH^2_4$ | $HH^2_6$ | | $HH^2_n$ |
| $LH^4_1$ | $LH^4_3$ | $LH^4_5$ | | $LH^4_{n-1}$ | $HH^4_2$ | $HH^4_4$ | $HH^4_6$ | | $HH^4_n$ |
| $LH^6_1$ | $LH^6_3$ | $LH^6_5$ | | $LH^6_{n-1}$ | $HH^6_2$ | $HH^6_4$ | $HH^6_6$ | | $HH^6_n$ |
| | | | | | | | | | |
| $LH^m_1$ | $LH^m_3$ | $LH^m_5$ | | $LH^m_{n-1}$ | $HH^m_2$ | $HH^m_4$ | $HH^m_6$ | | $HH^m_n$ |

Arrows $O_0$ and $O_1$ indicated above the table.

FIG.21

TWO-DIMENSIONAL SUBBAND CODING EQUIPMENT

BACKGROUND OF THE INVENTION

1. Field of the Invention

The present invention relates to a two-dimensional subband coding equipment applied in a wavelet transformer or the like.

This application claims the priority of the Japanese Patent Application No. 2002-104414 filed on Apr. 5, 2002, the entirety of which is incorporated by reference herein.

2. Description of the Related Art

Recently, a still image compression method called JPEG 2000 (ISO/IEC JTC 1/SC 29/WG1) has been proposed. JPEG 2000 adopts an encoding algorithm called "wavelet transform". The wavelet transform is a subband conversion technique for breaking a data stream into low- and high-frequency band components.

According to JPEG, two-dimensional image data is subjected to two-dimensional wavelet transform. The two-dimensional wavelet transform is such that two-dimensional image data P (or low-frequency band coefficient after the wavelet transform) is subject to one-dimensional wavelet transform vertically and separated into vertical low-frequency band coefficient (L coefficient) and vertical high-frequency band coefficient (H coefficient), as shown in FIG. 1. Then, The L and H coefficients are subjected to horizontal one-dimensional wavelet transform, respectively. As a result, there are generated four coefficients including a horizontal low-frequency band component/vertical low-frequency band component coefficient (LL coefficient), horizontal low-frequency band component/vertical high-frequency band component coefficient (HL coefficient), horizontal high-frequency band component/vertical low-frequency band component coefficient (LH coefficient) and horizontal high-frequency band/vertical high-frequency band component coefficient (HH coefficient). The number of coefficients of each of both the vertical and horizontal frequency components after the two-dimensional wavelet transform is a half of the number of image data before subjected to the transform.

According to JPEG 2000, it is possible to recurrently break the two-dimensional image data into different frequency bands by iterating the wavelet transform of the LL coefficient as shown in FIG. 2. The number of recurrent frequency band divisions is given by N(L). N(L)=0 indicates that no wavelet transform has been done, N(L)=1 indicates that the wavelet transform has been done once, and N(L)=2 indicates that the wavelet transform has been done twice.

FIG. 3 is a block diagram of a one-dimensional wavelet transformer, in which FIG. 3(A) is a block diagram of a forward transformer while FIG. 3(B) is a block diagram of an inverse transformer.

The forward transformer is generally indicated with a reference 110. The forward transformer 110 includes a low-pass filter (H0) 111 which passes low-frequency band components of an image data stream, a downsampler 112 to halve the sampling rate of the low-frequency band coefficient stream passed through the low-pass filter (H0) 111, a high-pass filter (H1) 113 which passes high-frequency band components of the image data stream, and a downsampler 114 to halve the sampling rate of the high-frequency band coefficient stream passed through the high-pass filter (H1) 113. The inverse transformer is generally indicated with a reference 120. The inverse transformer 120 includes an upsampler 121 to double the sampling rate of the low-frequency band coefficient, a low-pass filter (F0) 122 which passes low-frequency band components of the upsampled low-frequency band coefficient stream, an upsampler 123 to double the sampling rate of the high-frequency band coefficient stream, a high-pass filter (F1) 124 which passes high-frequency band components of the upsampled high-frequency band coefficient stream, and an adder 125 to add together data output from the low-pass filter (F0) 122 and data output from the high-pass filter (F1) 123 to provide the image data stream.

For example, to implement five-by-three wavelet transform, the coefficient (H0, F0) of the low-pass filter and that (H1, F1) of the high-pass filter are as follows:

$H0=(-1, 2, 6, 2, -1)/8$ $F0=(-1, 2, -1)/2$ $H1=(1, 2, 1)/2$ $F1=(-1, 2, 6, 2, -1)/8$

Note that the wavelet transformer shown in FIG. 3 is for a one-dimensional data stream. Thus, to implement two-dimensional wavelet transform, the one-dimensional wavelet transformer 110 should include a memory 130 into which a wavelet coefficient calculated by a first vertical wavelet transform is to be stored once and from which the wavelet coefficient is to be read after completion of the first wavelet transform for undergoing a second horizontal wavelet transform, as shown in FIG. 4.

However, the memory 130 provided in the one-dimensional wavelet transformer to store such intermediate processed data has the capacity increased depending upon the size of input image, which will lead to an increased scale of the entire two-dimensional wavelet transform circuit. Also, since the second wavelet transform can only be effected after completion of all the first wavelet transform, the processing will take a longer time.

SUMMARY OF THE INVENTION

It is therefore an object of the present invention to overcome the above-mentioned drawbacks of the related art by providing a two-dimensional wavelet transformer whose circuit scale is reduced and which can process data in a reduced time.

The above object can be attained by providing a two-dimensional subband coding equipment which separates original data two-dimensionally arrayed in two directions, namely, in X and Y directions, into X- and Y-directional low- and high-frequency band component subbands. The two-dimensionally arrayed data is a group of two-dimensionally arrayed data, such as image data.

The two-dimensional subband coding equipment according to the present invention includes an X-directional subband transform means, Y-directional subband transform means, and a control means.

The X-directional subband transform means calculates X-directional low-frequency band data that are X-directional low-frequency band components of the two-dimensionally arrayed original data and X-directional high-frequency band data that are X-directional high-frequency band components of the two-dimensionally arrayed original data to provide two-dimensionally arrayed X-directional low- and high-frequency band data.

The X-directional subband transform means is supplied with a predetermined number of original data arrayed in the X direction in the two-dimensional array at each transform, and calculates one X-directional low-frequency band data and one X-directional high-frequency band data on the basis of the supplied predetermined number of X-directionally arrayed original data.

The Y-directional subband transform means calculates X- and Y-directional low-frequency band data that are Y-directional low-frequency band components of the two-dimensionally arrayed X-directional low-frequency band data, X-directional low-frequency band and Y-directional high-frequency band data that are Y-directional high-frequency band components of the two-dimensionally arrayed X-directional low-frequency band data, X-directional high-frequency band and Y-directional low-frequency band data that are Y-directional low-frequency band components of the two-dimensionally arrayed X-directional high-frequency band data, and X- and Y-directional high-frequency band data that are Y-directional high-frequency band components of the two-dimensionally arrayed X-directional high-frequency band data to provide two-dimensionally arrayed X- and Y-directional low-frequency band data, X-directional low-frequency band and Y-directional high-frequency band data, X-directional high-frequency band and Y-directional low-frequency band data, and X- and Y-directional high-frequency band data.

The Y-directional subband transform means is supplied, for each transform, with a predetermined number of X-directional low- or high-frequency band data arrayed in the Y direction in the two-dimensional array, and calculates one X- and Y-directional low-frequency band data and one X-directional low-frequency band and Y-directional high-frequency band data on the basis of the supplied predetermined number of Y-directionally arrayed X-directional low-frequency band data, and also one X-directional high-frequency band and Y-directional low-frequency band data and one X- and Y-directional high-frequency band data on the basis of the supplied predetermined number of Y-directionally arrayed X-directional high-frequency band data.

The control means controls data to be supplied to the X-directional subband transform means and Y-directional subband transform means.

Further, the control means supplies the predetermined number of X-directionally arrayed original data to the X-directional subband transform means in the Y-direction. Also, the control means supplies the predetermined number of Y-directionally arrayed X-directional low-frequency band data and predetermined number of Y-directionally arrayed X-directional high-frequency band data to the Y-directional subband transform means in the output sequence of the X-directional subband transform means, while supplying the X-directional low- and high-frequency band data alternately to the Y-directional subband transform means at each transform by the Y-directional subband transform means.

In the above two-dimensional coder according to the present invention, the X-directional subband transform means makes X-directional subband transform of X- and Y-directionally arrayed original data, while the Y-directional subband transform means makes Y-directional subband transform of such original data, thus providing two-dimensional subband transform of the original data.

The X-directional subband transform means is supplied with two-dimensionally arrayed original data so that X- and Y-directional low-frequency band data output strings resulted from the above transform will be provided sequentially in the Y direction in the two-dimensional array.

Further, in the two-dimensional subband coding equipment according to the present invention, the Y-directional subband transform means makes Y-directional subband transform of the X-directional low-frequency band data while making Y-directional subband transform of the X-directional high-frequency band data.

The Y-directional subband transform means is sequentially supplied with a string of X-directional low-frequency data and a string of X-directional high-frequency band data in the output sequence of the X-directional subband transform means, namely, in the Y-direction. Also, the Y-directional subband transform means makes subband transform of both the X-directional low- and high-frequency band data by making alternate transform the X- and Y-directional low-frequency band data.

Also, the two-dimensional subband coding equipment according to the present invention can have applied therein a five-by-three lifting type wavelet transform for the two-dimensional subband transform, for example.

In this case, the control means for controlling input data to the X- and Y-directional subband transform means includes an X-line buffer and Y-directional high-frequency band data buffer.

The X-line buffer holds the X-directional high-frequency band data supplied from the X-directional subband transform means for one Y-directional line. The Y-directional high-frequency band data buffer holds one of the X-directional low-frequency band and Y-directional high-frequency band data and one of the X- and Y-directional high-frequency band data, supplied from the Y-directional subband transform means.

The control means supplies X-directionally arrayed three original data to the X-directional subband transform means, while reading, from the X-line buffer, X-directional high-frequency band data having been outputted one Y-directional line before and supplying the data to the X-directional subband transform means. Also, the control means outputs the X-directional low- and high-frequency band data for one Y-directional line, and then shifts the X-directionally arrayed three data by two data in the Y direction and supplies the thus shifted data to the X-directional subband transform means.

Further, for making Y-directional subband transform of the X-directional low-frequency band data, the control means supplies Y-directionally arrayed three X-directional low-frequency band data to the Y-directional subband transform means, while reading one-data-previous X-directional low-frequency band and Y-directional high-frequency band data from the Y-directional high-frequency band data buffer and supplying the data to the Y-directional subband transform means. Also, for making Y-directional subband transform of the X-directional high-frequency band data, the control means supplies Y-directionally arrayed three X-directional high-frequency band data to the Y-directional subband transform means, while reading one-data-previous X- and Y-directional high-frequency band data from the Y-directional high-frequency band data buffer and supplying the data to the Y-directional subband transform means. Further, the control means shifts the X-directional low- and high-frequency band data, supplied from the X-directional subband transform means, by two data in the Y direction at every three data, and supplies the thus shifted data to the Y-directional subband transform means.

These objects and other objects, features and advantages of the present invention will become more apparent from the following detailed description of the preferred embodiments

BRIEF DESCRIPTION OF THE DRAWINGS

FIG. 5 explains the array of original image data;

FIG. 6 explains the array of the coefficient data after making vertical wavelet transform of the original image data;

FIG. 7 explains the array of the coefficient data after making two-dimensional wavelet transform of the original image data;

FIG. 13 explains the input sequence of original image data to the vertical wavelet transform block;

FIG. 14 explains the output sequence of coefficients when the original image data are supplied to the vertical wavelet transform block in the sequence shown in FIG. 13;

FIG. 15 explains the input sequence of data to the vertical wavelet transform block after the original image data shown in FIG. 13 are supplied;

FIG. 16 explains the output sequence of coefficients when the original image data are supplied to the vertical wavelet transform block in the sequence shown in FIG. 15;

FIG. 19 explains the output sequence of coefficients when the original image data are supplied to the vertical wavelet transform block in the sequence shown in FIG. 18;

FIG. 20 explains the input sequence of data to the horizontal wavelet transform block after the original image data shown in FIG. 18 are supplied;

FIG. 21 explains the output sequence of coefficients when the original data are supplied to the horizontal wavelet transform block in the sequence shown in FIG. 20;

DETAILED DESCRIPTION OF THE PREFERRED EMBODIMENTS

As an embodiment of the present invention, a two-dimensional wavelet transformer destined for the five-by-three wavelet transform will be described with reference to the accompanying drawings.

Data to Process, and Overall Construction of the Apparatus

Original image data processed by the two-dimensional wavelet transformer according to the present invention are made significant by including data arrayed in an m×n two-dimensional matrix composed of m vertical (X-directional) pixels and n horizontal (Y-directional) pixels. In the explanation of this embodiment, each of pixels forming together the original image data will be given by $P^x_y$ as shown in FIG. 5. Also, coefficient data of low-frequency band components after the original image data has subjected to the vertical wavelet transform will be given by $L^x_y$, while coefficient data of high-frequency band components will be represented by $H^x_y$, as shown in FIG. 6. Further, coefficient data of horizontal low-/vertical low-frequency band components after the original image data has subjected to two-dimensional wavelet transform in the horizontal and vertical directions will be given by $LL^x_y$, coefficient data of horizontal high-frequency and vertical low-frequency band components be given by $HL^x_y$, coefficient data of horizontal low-frequency band and vertical high-frequency band components be given by $LH^x_y$, and coefficient data of horizontal high-frequency and vertical high-frequency band components be given by $HH^x_y$, as shown in FIG. 7. It should be noted that the superscript "x" of each coefficient data indicates a vertical potion of a pixel in the two-dimensional matrix ($1 \leq x \leq m$) and the subscript "y" indicates a horizontal position of the pixel ($1 \leq y \leq n$).

Figure 1:
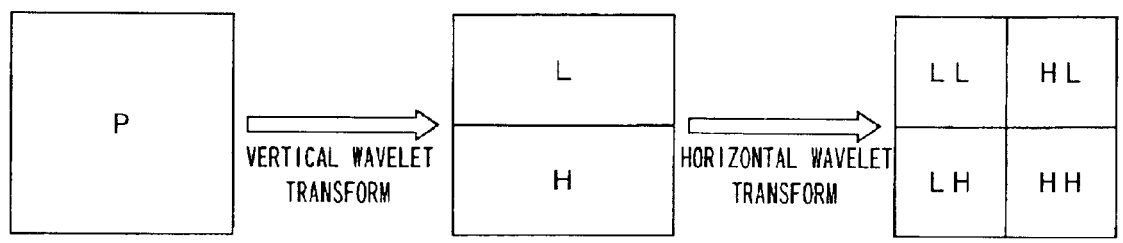
FIG. 1 explains the two-dimensional wavelet transform.
Figure 2:
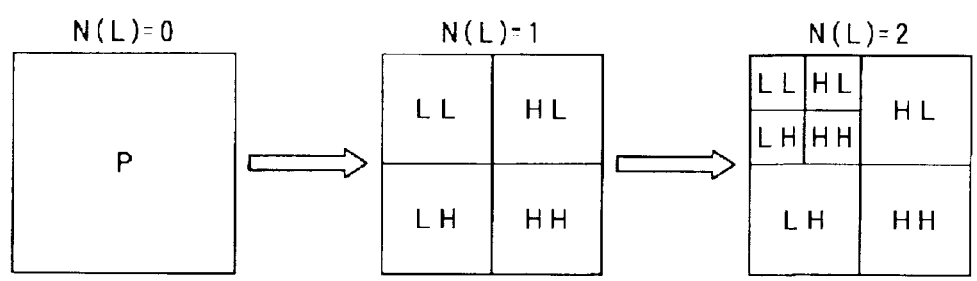
FIG. 2 explains the recurrent band division for the two-dimensional wavelet transform.
Figure 3A:
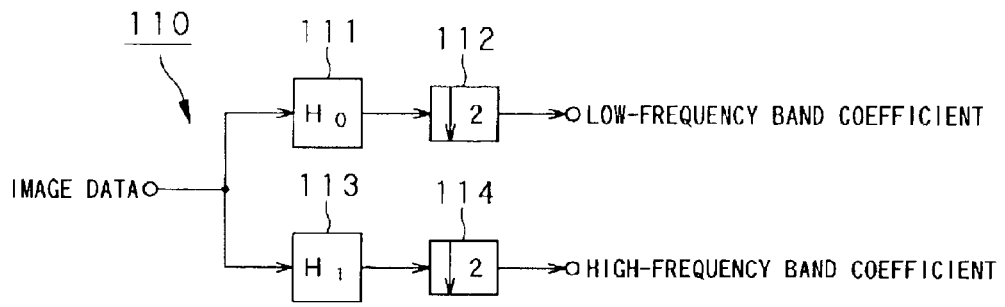
FIG. 3 is a block diagram of the one-dimensional wavelet transformer.
Figure 3B:
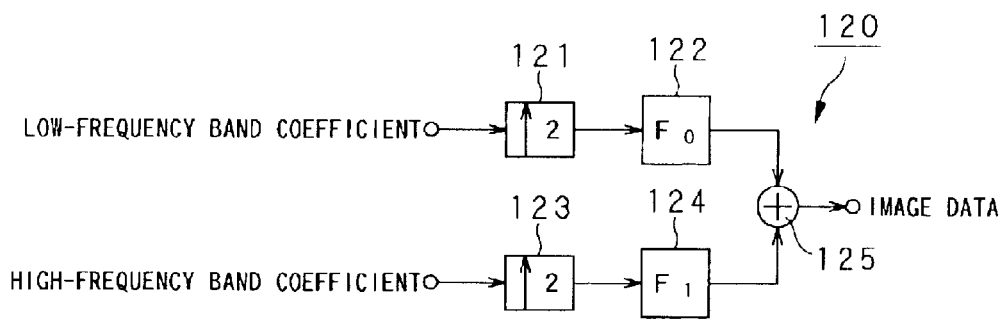
Figure 4:
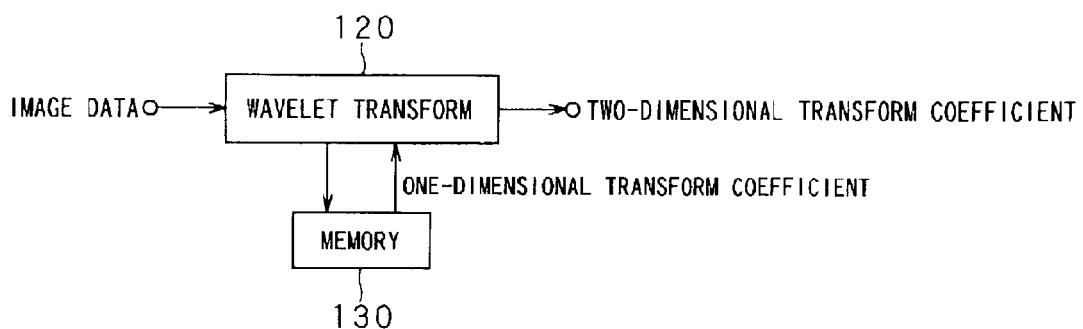
FIG. 4 is a block diagram of the two-dimensional wavelet transformer.
Figure 8:
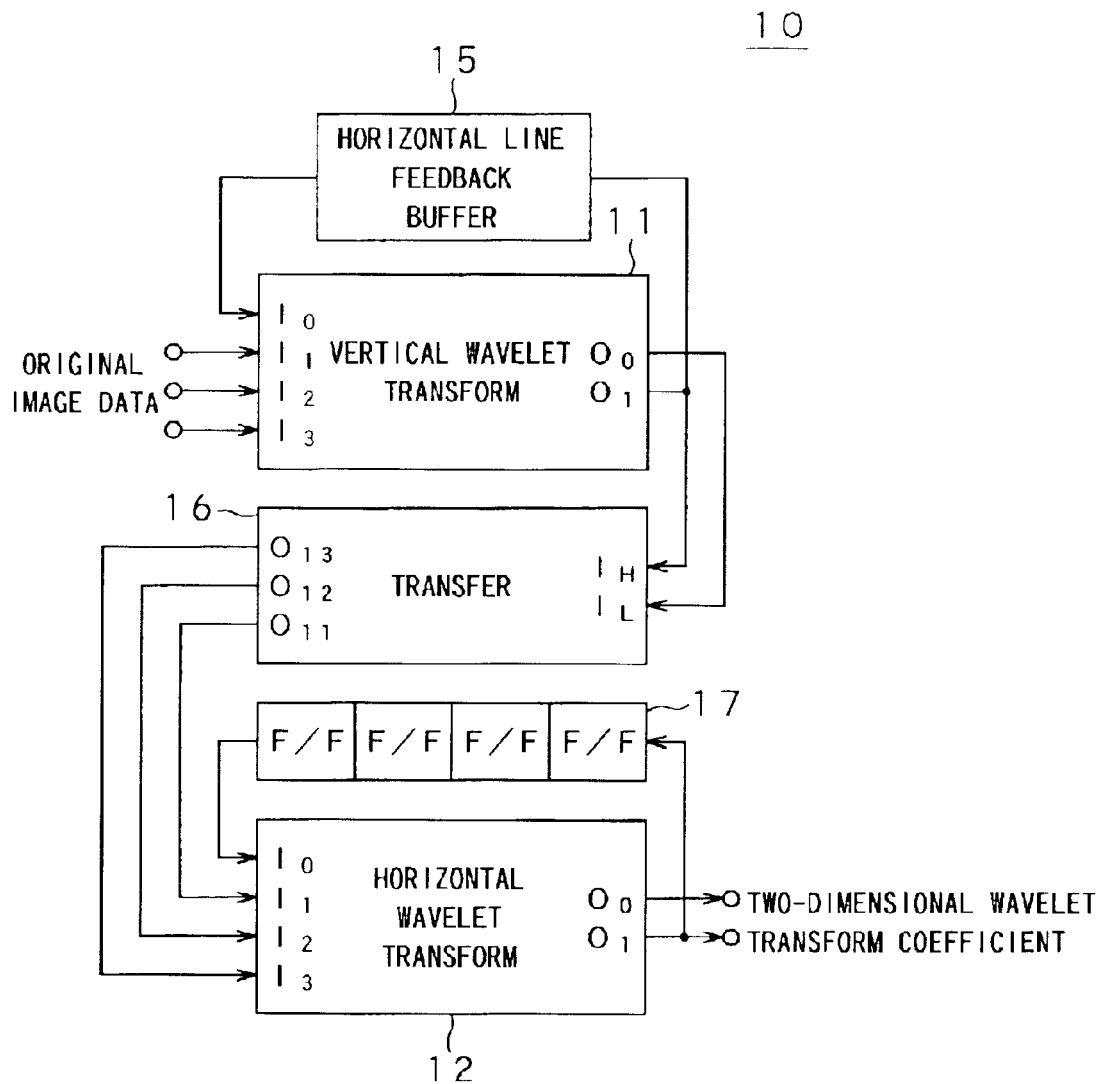
FIG. 8 is a block diagram of the two-dimensional wavelet transformer according to the present invention.

FIG. 8 is a block diagram of the two-dimensional wavelet transformer according to the present invention. The two-dimensional wavelet transformer is generally indicated with a reference 10.

As shown in FIG. 8, the two-dimensional wavelet transformer 10 according to the present invention includes a vertical wavelet transform block 11, horizontal wavelet transform block 12, horizontal line feedback buffer 15, transfer block 16, and a high-frequency band coefficient feedback buffer 17.

Wavelet Transform Blocks 11 and 12

Figure 9:
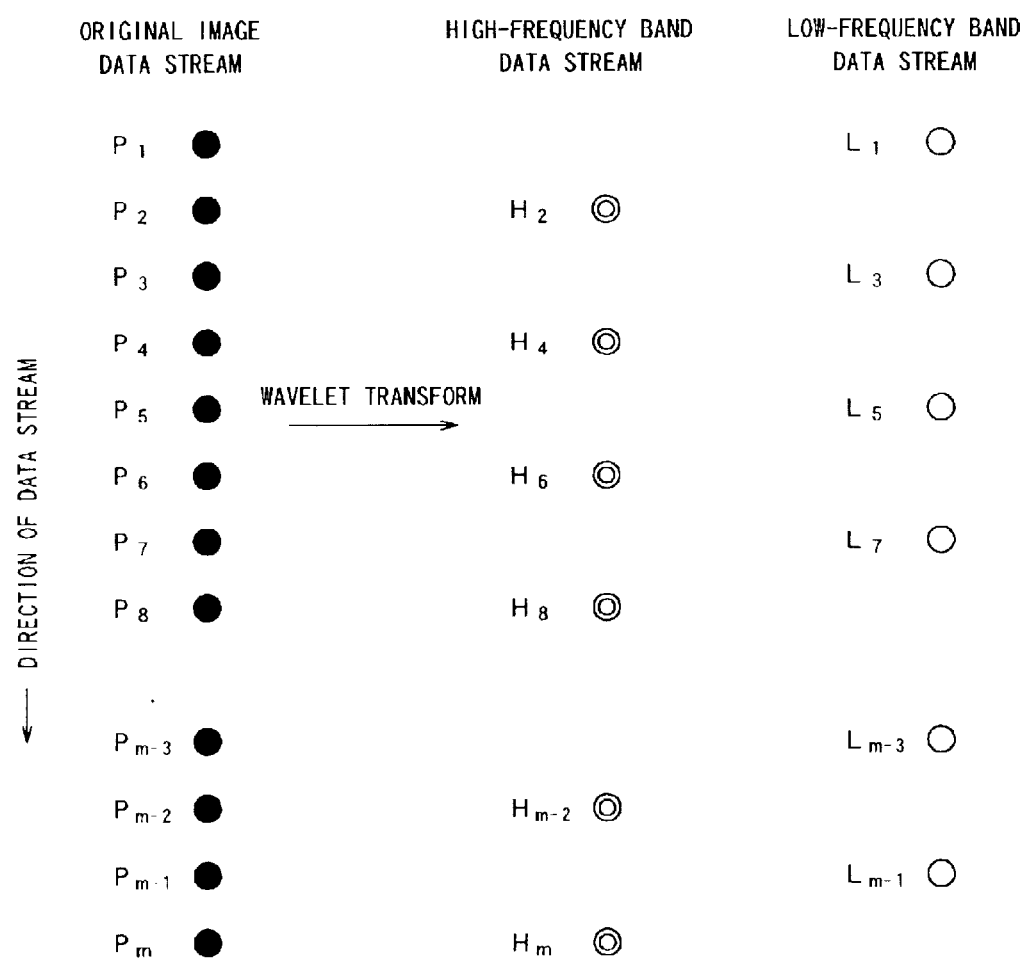
FIG. 9 explains the one-dimensional wavelet transform.

First the vertical and horizontal wavelet transform blocks 11 and 12 will be explained:

As shown in FIG. 9, each of the vertical and horizontal wavelet transform blocks 11 and 12 is a lifting type filter circuit supplied with a stream of one-dimensionally arrayed image data (or coefficient data) to provide a low-frequency band data stream and a high-frequency band data stream. Normally in the lifting type wavelet transform, one low-frequency band coefficient and one high-frequency band coefficient are calculated via one filtering. In this lifting type wavelet transform, the top to last pixels of an original data stream are sequentially filtered to produce a high-frequency band data stream and a low-frequency band data stream. In the five-by-three inverse wavelet transform, for example, an original data stream is subject to 5-by-three inverse filtering while being stepped two data to produce a high-frequency band data stream and a low-frequency band data stream.

Figure 10:
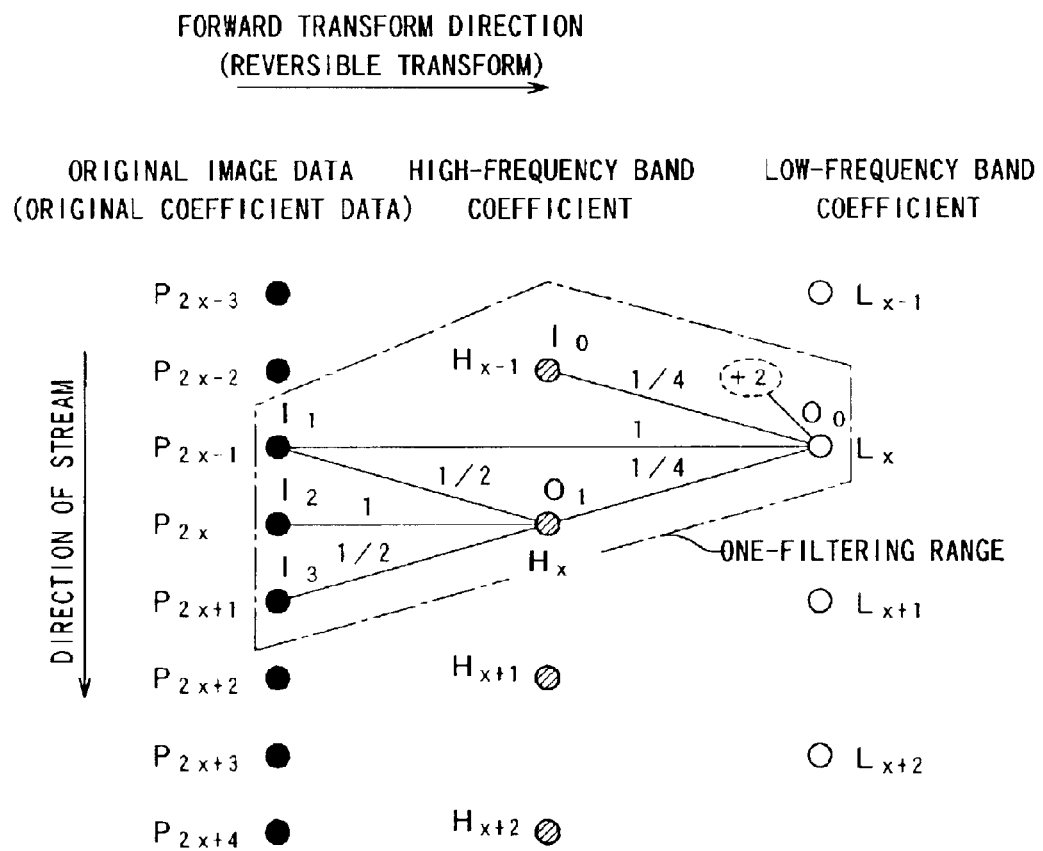
FIG. 10 explains the five-by-three inverse filtering.

FIG. 10 schematically shows a five-by-three inverse filter for determining an xth low-frequency band coefficient "$L_x$" in a low-frequency band data stream and an xth high-frequency band coefficient "$H_x$" in a high-frequency data stream.

To determine $L_x$ and $H_x$ by the five-by-three inverse filtering, the filter is supplied with a (2x+1)th original image data "$P_{2x-1}$", 2xth original image data "$P_{2x}$" and (2x+1)th original image data "$P_{2x+1}$", and with an (x−1)th high-frequency band coefficient "$H_{x-1}$" in a stream of high-frequency band coefficient data. It should be noted that $H_{x-1}$ is a high-frequency band coefficient having been determined during a preceding filtering when the original image data stream were sequentially filtered.

In the five-by-three inverse filtering, Lx and Hx are calculated based on the above input data as follows:

$$L_x = P_{2x-1} + \{(H_{x-1} + H_x + 2) >> 2\} \quad (1\text{-}1)$$

$$H_x = P_{2x} - \{(P_{2x-1} + P_{2x+1}) >> 1\} \quad (1\text{-}2)$$

where "X>>Y" in the above means that the value X of a binary digit (bit) is arithmetically shifted Y bits to the right.

On the assumption that $I_0 = H_{x-1}$, $I_1 = P_{2x-1}$, $I_2 = P_{2x}$, $I_3 = P_{2x+1}$, $O_0 = L_x$ and $d_n' = H_x$, the above equations (1-1) and (1-2) are rewritten as follows:

$$O_1 = I_1 + \{(I_0 + O_1 + 2) >> 2\} \quad (2\text{-}1)$$

$$O_0 = I_2 - \{(I_1 + I_3) >> 1\} \quad (2\text{-}2)$$

The vertical and horizontal wavelet transform blocks 11 and 12 are circuits for filtering by the equations (2-1) and (2-2), respectively.

Figure 11:
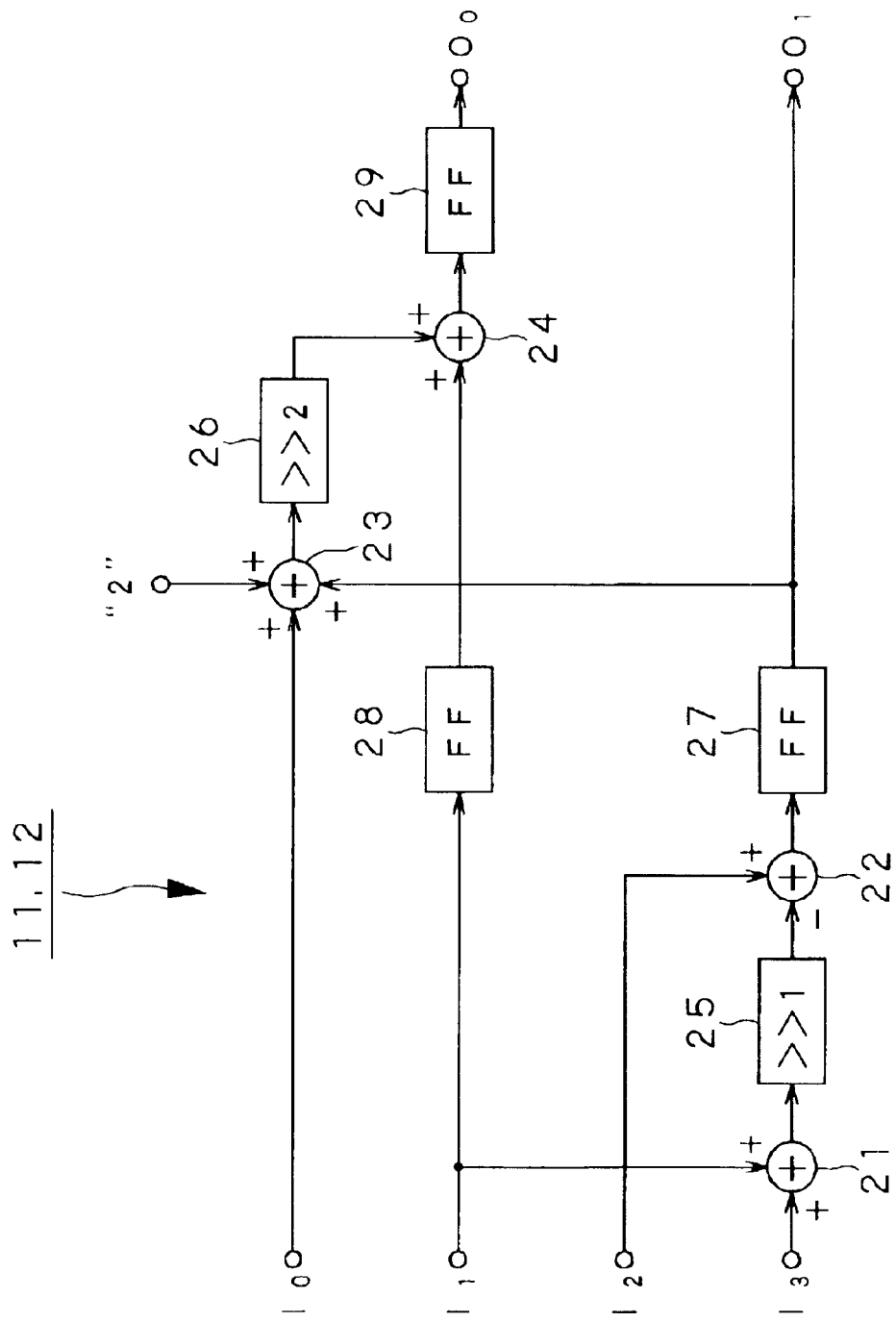
FIG. 11 is a circuit diagram of the vertical and horizontal wavelet transform blocks.

FIG. 11 shows a circuit diagram of each of the vertical and horizontal wavelet transform blocks 11 and 12 that calculates the equations (2-1) and (2-2).

As shown, each the vertical and horizontal wavelet transform blocks 11 and 12 is provided with input terminals $I_0$, $I_1$, $I_2$ and $I_3$. Each of the wavelet transform blocks 11 and 12 is supplied at these input terminals $I_0$, $I_1$, $I_2$ and $I_3$ thereof with data $I_0$, $I_1$, $I_2$ and $I_3$ included in the equations (2-1) and (2-2), respectively. Each of the vertical and horizontal wavelet transform blocks 11 and 12 is provided with output terminals $O_0$ and $O_1$, and outputs at these output terminals $O_0$ and $O_0$ thereof output data $O_0$ and $O_1$ given by the equations (2-1) and (2-2), respectively.

As shown in FIG. 11, each of the vertical and horizontal wavelet transform blocks 11 and 12 includes also a first, second, third and fourth adders 21, 22, 23 and 24, and a first and second bit shifters 25 and 26, and a first, second and third flip-flops 27, 28 and 29.

The first adder 21 adds together data $I_1$ supplied at the input terminal $I_1$ and data $I_3$ supplied at the input terminal $I_3$. The first bit shifter 25 arithmetically shifts data output from the first adder 21 one bit to the right. The second adder 22 subtracts data output from the first bit shifter 25 from data $I_2$ supplied at the input terminal $I_2$. Thus, the second adder 22 outputs data $O_1$ included in the above equation (2-1), and the output $O_1$ is delivered to outside at the output terminal $O_1$.

The first flip-flop 27 delays the data $O_1$ supplied from the second adder 22 by one clock and supplies the data to the third adder 23. The second flip-flop 28 delays the data $I_1$ supplied at the input terminal $I_1$ one clock, and supplies the data to the fourth adder 23. The third adder 24 adds together the data $I_0$ supplied at the input terminal $I_0$, data output $O_1$ from the first flip-flop 27 and a value "2". The second bit shifter 26 arithmetically shifts the data output from the third adder 23 by two bits to the left. The fourth adder 24 adds together data output from the second bit shifter 26 and data $I_1$ delayed one clock by the second flip-flop 28. Thus, the fourth adder 24 outputs data $O_0$ included in the above equation (2-2). The data output $O_0$ from the fourth adder 24 is delayed one clock by the third flip-flop 29 and delivered to outside at the output terminal $O_0$.

The vertical and horizontal wavelet transform blocks 11 and 12, constructed as mentioned above, makes five-by-three filtering. Therefore, the vertical and horizontal wavelet transform blocks 11 and 12 can calculate, via one filtering, one low-frequency band component $O_0$ and one high-frequency band component $O_1$. It should be noted that the vertical and horizontal wavelet transform blocks 11 and 12 makes one filtering with two clocks. The vertical and horizontal wavelet transform blocks 11 and 12 outputs the high-frequency band component $O_1$ at the first clock, and the low-frequency band component $O_0$ at the second clock.

Data Input/Output Sequence of Vertical Wavelet Transform Block 11

Next, there will be explained the sequence of inputting original image data P to the vertical wavelet transform block 11, and the sequence of outputting vertical low-frequency band coefficients (L coefficient) and vertical high-frequency band coefficients (H coefficient) calculated by the vertical wavelet transform block 11.

The vertical wavelet transform block 11 makes vertical one-dimensional wavelet transform of two-dimensional matrix-shaped original image data shown in FIG. 5, and outputs two-dimensional matrix-shaped L and H coefficients shown in FIG. 6.

Figure 12:
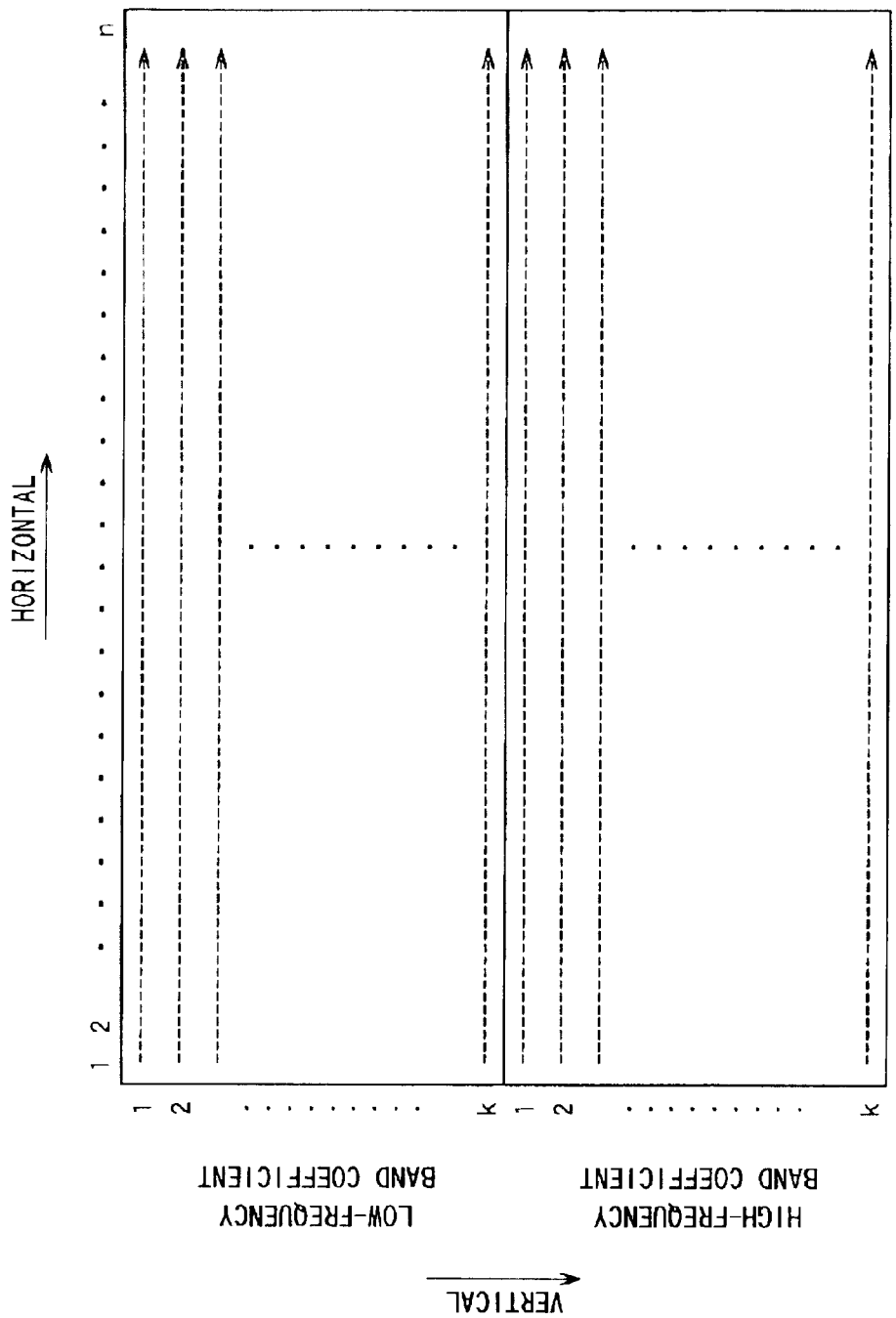
FIG. 12 explains the output sequence of coefficients from the vertical wavelet transform block.

The vertical wavelet transform block 11 is supplied with the original image data P so that the calculated L and H coefficients will be sequentially outputted pixel by pixel horizontally as shown in FIG. 12. That is, the vertical wavelet transform block 11 filters the original image data P vertically while scanning the original image data P horizontally. The timing of supplying the original image data P to the vertical wavelet transform block 11 are controlled by a memory controller or the like which reads the original image data P from a memory or the like, for example.

The input sequence of the original image data P will be described in detail below:

First, three horizontal lines, first, second and third, of the original image data P are sequentially supplied horizontally to the input terminals $I_1$, $I_2$ and $I_3$, respectively. More specifically, the original image data P are supplied to $\{I_1, I_2, I_3\}$ in a sequence of $\{P^1_1, P^2_1, P^3_1\} \to \{P^1_2, P^2_2, P^3_2\} \to \{P^1_3, P^2_3, P^3_3\} \to \{P^1_4, P^2_4, P^3_4\} \to \ldots \to \{P^1_{n-1}, P^2_{n-1}, P^3_{n-1}\} \to \{P^1_n, P^2_n, P^3_n\}$ as shown in FIG. 13. As a result, the L coefficients in the first line are delivered at the output terminal $O_0$ in a sequence of $L^1_1, L^1_2, L^1_3, L^1_4, \ldots, L^1_{n-1}$ and $L^1_n$, and H coefficients in the second line are delivered at the output terminal $O_1$ in a sequence of $H^2_1, H^2_2, H^2_3, H^2_4, \ldots, H^2_{n-1}$ and $H^2_n$, as shown in FIG. 14.

After completion of the vertical wavelet transform of the first line of each of the L and H coefficients, a next line of each of the L and H coefficients will be calculated.

The third line of the L coefficients and fourth line of the H coefficients are calculated by shifting the line of original image data P for supply to the vertical wavelet transform block 11 by two steps vertically. Say, the third, fourth and fifth lines of the original image data P are supplied to the vertical wavelet transform block 11. More specifically, the original image data P are supplied to $\{I_1, I_2, I_3\}$ in a sequence of $\{P^3_1, P^4_1, P^5_1\} \to \{P^3_2, P^4_2, P^5_2\} \to \{P^3_3, P^4_3, P^5_3\} \to \{P^3_4, P^4_4, P^5_4\} \to \ldots \to \{P^3_{n-1}, P^4_{n-1}, P^5_{n-1}\} \to \{P^3_n, P^4_n, P^5_n\}$ as shown in FIG. 15. As a result, the L coefficients in the third line are delivered at the output terminal $O_0$ in a sequence of $L^3_1, L^3_2, L^3_3, L^3_4, \ldots, L^3_{n-1}$ and $L^3_n$, and H coefficients in the fourth line are delivered at the output terminal $O_1$ in a sequence of $H^4_1, H^4_2, H^4_3, H^4_4, \ldots, H^4_{n-1}$ and $H^4_n$, as shown in FIG. 16.

Thereafter, the original image data P are sequentially supplied horizontally taking a vertical array of three pixels is taken as one set. When horizontal filtering of one line is complete, a line to input is shifted two steps vertically before entry, and the filtering is iterated down to the last L and H coefficients.

Note that the vertical wavelet transform block 11 calculates L and H coefficients by making lifting type five-by-three filtering. For calculation of low-frequency band coefficient $L^x_x$ and high-frequency band coefficient $H^x_x$ by making the lifting type five-by-three filtering, it is necessary to supply a vertically one-pixel-previous high-frequency band coefficient $H^x_{x-1}$ to the input terminal $I_0$. In case the vertical wavelet transform is done by sequentially supplying the two-dimensional matrix-shaped original image data P horizontally as in the vertical wavelet transform block 11, the vertically one-pixel-previous high-frequency band data will have been calculated one horizontal line before. Therefore, the two-dimensional wavelet transformer 10 can make the lifting type five-by-three filtering since it includes the horizontal line feedback buffer 15 which feeds back high-frequency band coefficients H having been outputted one horizontal line before.

The horizontal line feedback buffer 15 is a RAM to hold H coefficient outputs from the vertical wavelet transform block 11 for a period of one horizontal line. That is, since the vertical wavelet transform block 11 makes one operation for a period of two clocks, the horizontal line feedback buffer 15 will hold the output H coefficients for a period of 2×n clocks (n is a number of horizontal pixels in the original image data). One-horizontal-line-previous H coefficient output from the horizontal line feedback buffer 15 is supplied to the vertical wavelet transform block 11 at the input terminal $I_0$. Say, the H coefficient will be supplied to the vertical wavelet transform block 11 in a sequence of horizontally scanning the two-dimensional matrix shown in FIG. 6.

Figure 17:
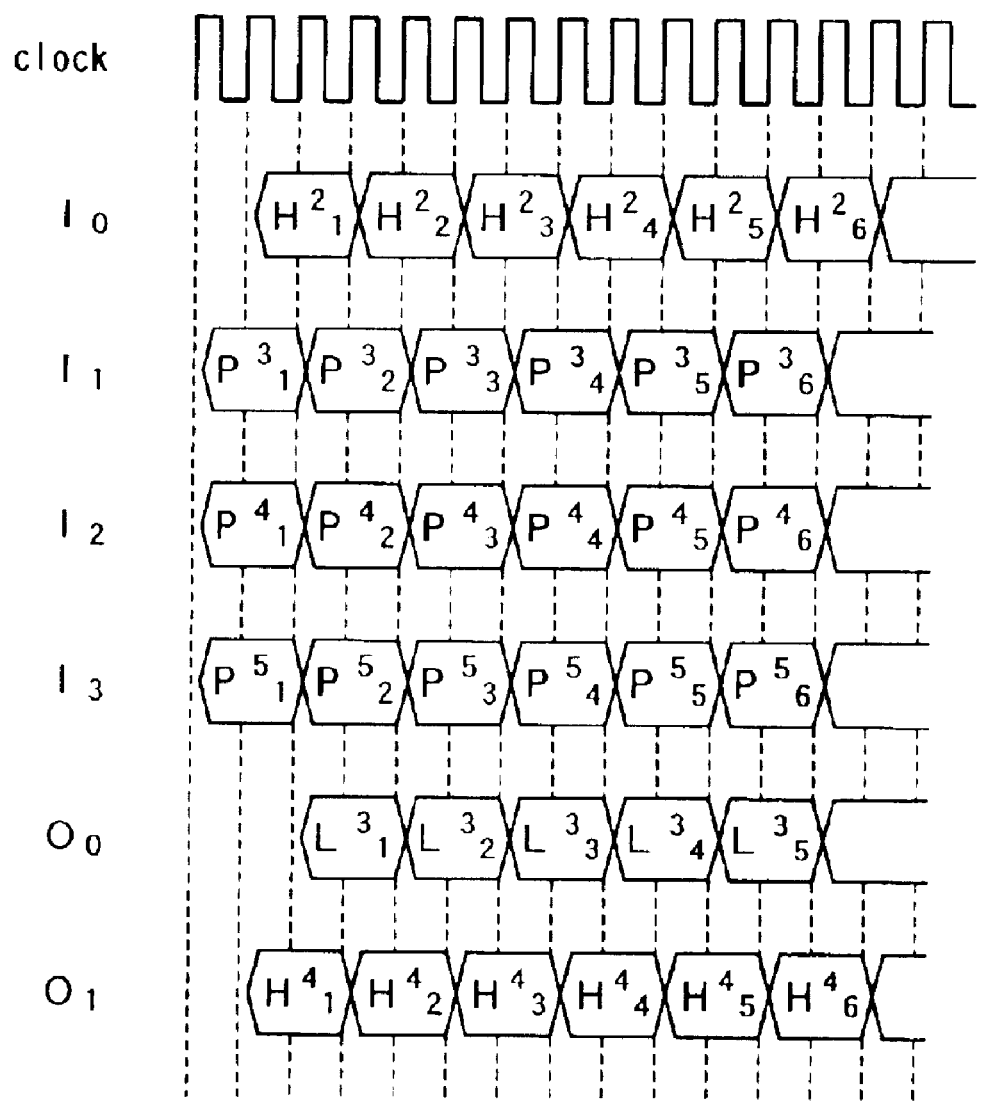
FIG. 17 shows the data input/output timing of the horizontal wavelet transform block.

FIG. 17 shows the input timing of original image data P and one-horizontal-line-previous H coefficient, for supply to the vertical wavelet transform block 11, and the output timing of L and H coefficients from the vertical wavelet transform block 11.

As shown in FIG. 17, the vertical wavelet transform block 11 makes one operation per two clocks. Say, the vertical wavelet transform block 11 calculates one L coefficient and one H coefficient with 2 clocks. It should be noted that the L coefficient is outputted one clock later than the H coefficient.

Data Input/Output Sequence of Horizontal Wavelet Transform Block 12

Next, there will be explained a sequence of inputting L and H coefficients to the horizontal wavelet transform block 12 and a sequence of outputting LL, HL, LH and HH coefficients calculated by the horizontal wavelet transform block 12.

The horizontal wavelet transform block 12 makes horizontal one-dimensional wavelet transform of L and H coefficients arrayed in a two-dimensional matrix as shown in FIG. 6 to provide LL, HL, LH and HH coefficients arrayed in a two-dimensional matrix as shown in FIG. 7.

The horizontal wavelet transform block 12 makes horizontal wavelet transform of the L and H coefficients supplied from the vertical wavelet transform block 11. The L and H coefficients supplied from the vertical wavelet transform block 11 are supplied to the transfer block 16 once. The transfer block 16 controls the data input timing to supply the L and H coefficients to the horizontal wavelet transform block 12.

Note that the horizontal wavelet transform block 12 horizontally filters two kinds of coefficients, namely, L and H coefficients. Thus, the horizontal wavelet transform block 12 is supplied with the L and H coefficients at the transfer timing controlled by the transfer block 16 so that the L and H coefficients are filtered once alternately. Say, the horizontal wavelet transform block 12 is supplied with the L and H coefficients in the output sequence of the vertical wavelet transform block 11 shown in FIG. 12.

More specifically, the horizontal wavelet transform block 12 filters the L and H coefficients horizontally while scanning them horizontally, and the L and H coefficients are filtered alternately once, respectively.

Figure 18:
FIG. 18 explains the input sequence of the original image data to the horizontal wavelet transform block.

The input sequences of the L and H coefficients will be described in detail below:

First, three top H coefficients arrayed horizontally are supplied to the input terminals $I_1$, $I_2$ and $I_3$. More specifically, $\{H^2_1, H^2_2, H^2_3\}$ is supplied to $\{I_1, I_2, I_3\}$ as shown in FIG. 18. As a result, $LH^2_1$ is delivered at the output terminal $O_0$, and $HH^2_2$ is at the output terminal $O_1$, as shown in FIG. 19. Next, three top L coefficients arrayed horizontally are supplied to the input terminals $I_1$, $I_2$ and $I_3$. More specifically, $\{L^1_1, L^1_2, L^1_3\}$ is supplied to $\{I_1, I_2, I_3\}$ as shown in FIG. 18. As a result, $LL^1_1$ is delivered at the output terminal $O_0$, and $HL^1_2$ is at the output terminal $O_1$, as shown in FIG. 19.

Next, the H and L coefficients are shifted two steps horizontally and supplied to the input terminals $I_1$, $I_2$ and $I_3$. That is, the three input data are shifted two data in the direction of a stream of output data from the vertical wavelet transform block 11 and supplied to the input terminals $I_1$, $I_2$ and $I_3$. More specifically, $\{H^2_3, H^2_4, H^2_5\}$ is supplied to $\{I_1, I_2, I_3\}$ as shown in FIG. 20. As a result, $LH^2_3$ is delivered at the output terminal $O_0$, and $HH^2_4$ is at the output terminal $O_1$, as shown in FIG. 21. Then, $\{L^1_3, L^1_4, L^1_5\}$ is supplied to $\{I_1, I_2, I_3\}$ as shown in FIG. 20. As a result, $LL^1_3$ is delivered at the output terminal $O_0$, and $HL^1_4$ is at the output terminal $O_1$, as shown in FIG. 21.

Thereafter, three horizontally arrayed H coefficients and three horizontally arrayed L coefficients are taken as one set, shifted two steps horizontally and horizontally filtered alternately. Upon completion of filtering of one horizontal line, the H and L coefficients are shifted one line vertically, a next line of the H and L coefficients is filtered horizontally and the filtering is iterated until the last coefficient data are obtained.

Note that the horizontal wavelet transform block 12 calculates LL, HL, LH and HH coefficients by making lifting type five-by-three filtering. For calculation of coefficient $LL^x_y$ and coefficient $HL^x_y$ by making the lifting type five-by-three horizontal filtering, a horizontally one-pixel-previous high-frequency band coefficient $HL^{x-2}_y$ has to be supplied to the input terminal $I_0$. Similarly, for calculation of coefficient $LH^x_y$ and coefficient $HH^x_y$ by making the lifting type five-by-three horizontal filtering, a horizontally one-pixel-previous high-frequency band coefficient $HH^x_y$ has to be supplied to the input terminal $I_0$.

In case the two-dimensional matrix of L and H coefficients is sequentially supplied horizontally and the L and H coefficients are horizontally filtered alternately as in the horizontal wavelet transform block 12, the horizontally one-pixel-previous high-frequency band coefficients have been determined by the two-step-previous filtering. Therefore, the two-dimensional wavelet transformer 10 can make the lifting type five-by-three filtering since it includes the high-frequency band coefficient feedback buffer 17 which feeds back high-frequency band coefficients HH and LH having been determined by the two-step-previous filtering.

The high-frequency band coefficient feedback buffer 17 is an FIFO buffer to hold high-frequency band coefficients (HL and HH coefficients) supplied the horizontal wavelet transform block 12 for a period of two operations of filtering. That is, since the horizontal wavelet transform block 12 makes one operation for a period of two clocks, the high-frequency band coefficient feedback buffer 17 will hold the output high-frequency band coefficients (HL and HH) for a period of 2×2 clocks. Two-horizontal-line-previous high-frequency band coefficient outputs (HL and HH) from the high-frequency band coefficient feedback buffer 17 are supplied to the horizontal wavelet transform block 12 at the input terminal $I_0$. That is to say, the high-frequency band coefficients (HL and HH) will be supplied to the horizontal wavelet transform block 12 in a sequence of horizontally scanning the two-dimensional matrix shown in FIG. 7.

Figure 22:
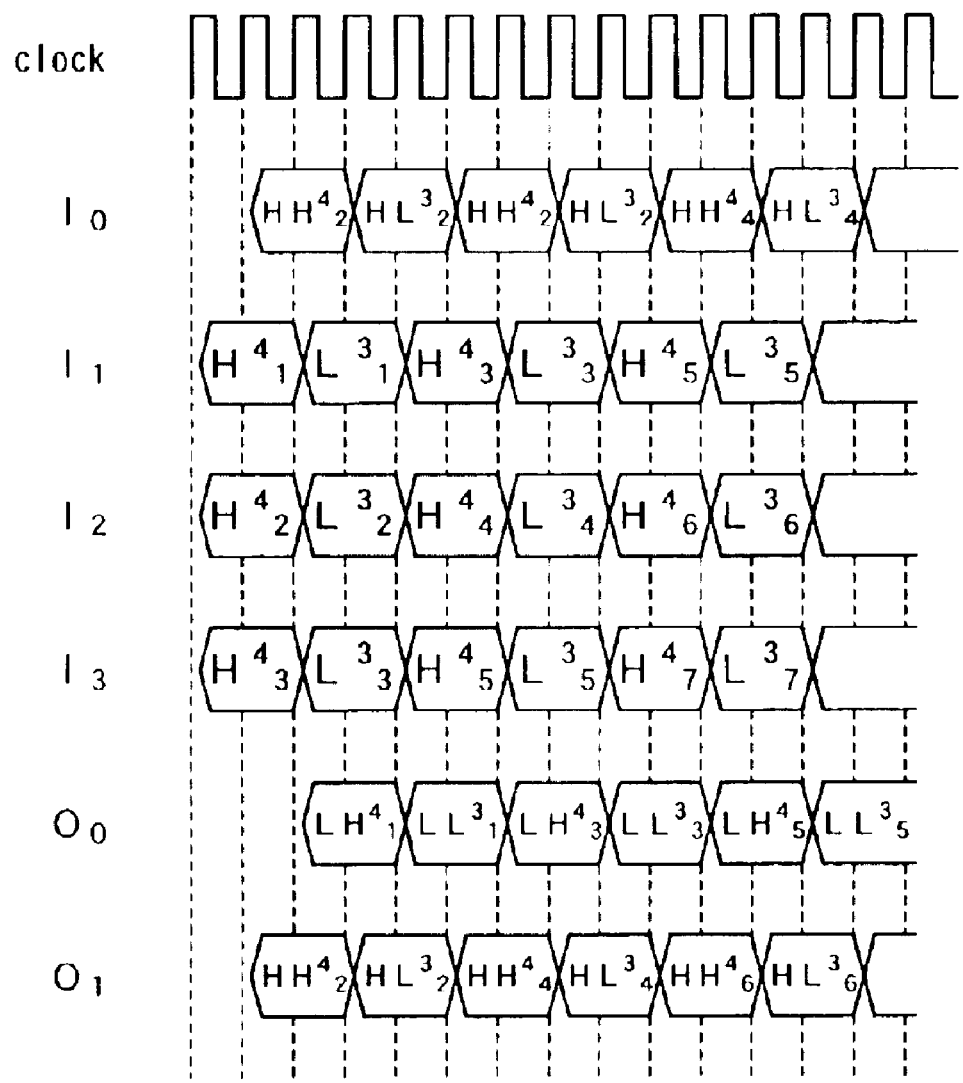
FIG. 22 shows the data input/output timing of the horizontal wavelet transform block.

FIG. 22 shows the input timing of the L and H coefficients for supply to the horizontal wavelet transform block 12, input timing of the fed-back HL and HH coefficients for supply to the horizontal wavelet transform block 12, and output timing of the LL, HL, LH and HH coefficients from the horizontal wavelet transform block 12.

As shown in FIG. 22, the horizontal wavelet transform block 12 makes one operation per two clocks. Say, the horizontal wavelet transform block 12 calculates one L coefficient and one H coefficient with 2 clocks.

Transfer Block 16

Next, the transfer block 16 will be explained.

The transfer block 16 controls the data transfer timing so that the L and H coefficient outputs from the vertical wavelet transform block 11 will match the input timing of the horizontal wavelet transform block 12.

Figure 23:
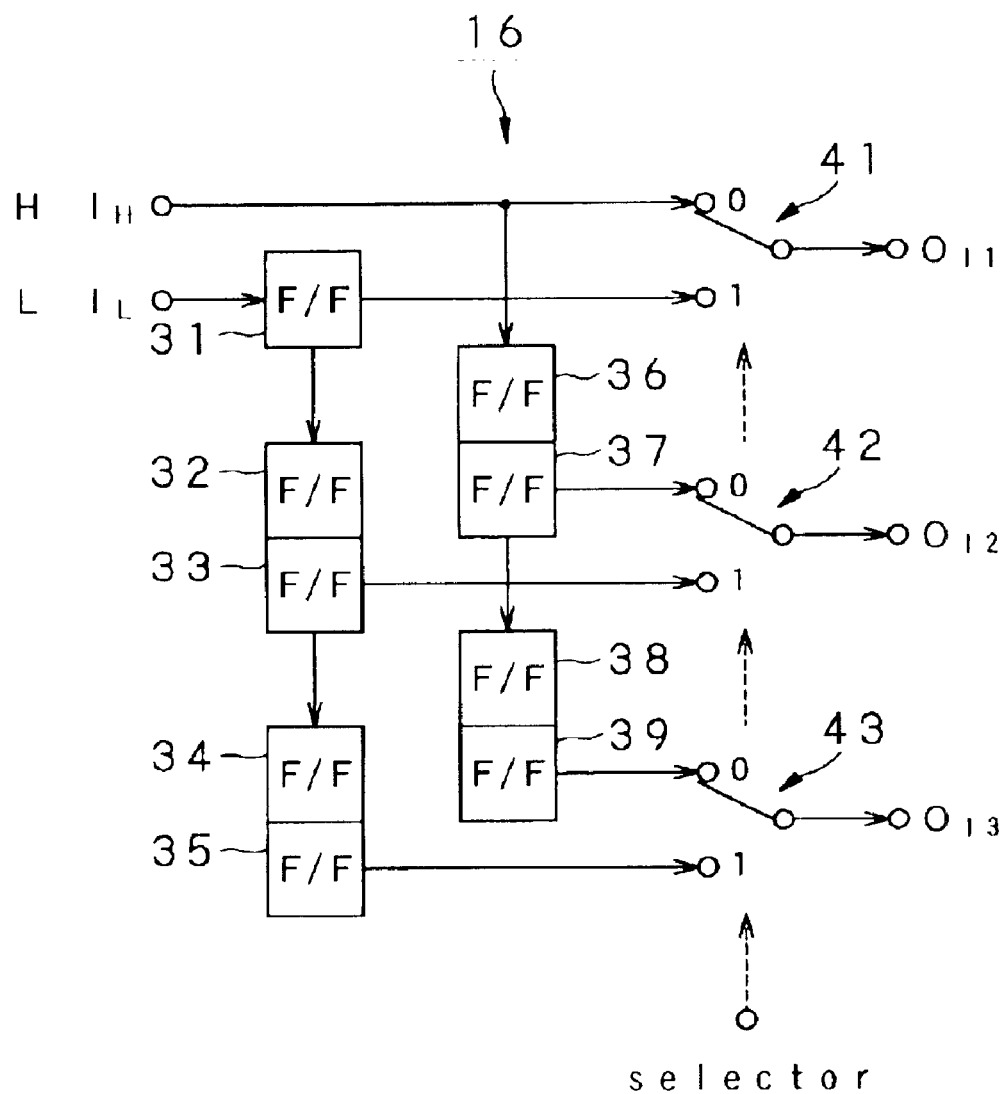
FIG. 23 is a circuit diagram of the transfer block.

FIG. 23 is a block diagram of the transfer block 16. As shown, the transfer block 16 is provided with input terminals $I_L$, and $I_H$, and output terminals $O_{11}$, $O_{12}$ and $O_{13}$.

The transfer block 16 receives input data at the input terminals $I_L$ and $I_H$ thereof.

The transfer block 16 is supplied at the input terminal $I_L$ thereof with data output delivered at the output terminal $O_0$ of the vertical wavelet transform block 11. That is, the transfer block 16 is supplied at the input terminal $I_L$ thereof with L coefficient outputs from the vertical wavelet transform block 11, and at the input terminal $I_H$ with data delivered at the output terminal $O_1$ of the vertical wavelet transform block 11. That is, the transfer block 16 is supplied at the input terminal $I_H$ thereof with H coefficient outputs from the vertical wavelet transform block 11.

The transfer block 16 delivers data at the output terminals $O_{11}$, $O_{12}$ and $O_{13}$ thereof. Data delivered at the output terminal $O_{11}$ is supplied to the horizontal wavelet transform block 12 at the input terminal $I_1$. Data delivered at the output terminal $O_{12}$ is supplied to the horizontal wavelet transform block 12 at the input terminal $I_2$. Data delivered at the output terminal $O_{13}$ is supplied to the horizontal wavelet transform block 12 at the input terminal $I_3$.

The transfer block 16 includes first to ninth flip-flops (F/F) 31 to 39 to delay data one clock, and first to third select switches 41 to 43 to select either of two input data for delivery from the transfer block 16.

The first F/F 31 is supplied with L coefficients via the input terminal $I_L$, the second F/F 32 is supplied with L coefficient outputs from the first F/F 31, third F/F 33 is supplied with L coefficient outputs from the second F/F 32, fourth F/F 34 is supplied with L coefficient outputs from the third F/F 34, and the fifth F/F 35 is supplied with L coefficient outputs from the fourth F/F 34. Therefore, the first F/F 31 outputs L coefficients delayed one clock from the time when the L coefficients have been supplied to the input terminal $I_L$, the third F/F 33 outputs L coefficients delayed three clocks from the time when the L coefficients have been supplied to the input terminal $I_L$, and the fifth F/F 35 outputs L coefficients delayed five clocks from the time when the L coefficients have been supplied to the input terminal $I_L$.

The sixth F/F 36 is supplied with H coefficients via the input terminal $I_H$, the seventh F/F 37 is supplied with H coefficient outputs from the sixth F/F 36, the eighth F/F 38 is supplied with H coefficient outputs from the seventh F/F 37, and the ninth F/F 39 is supplied with H coefficient outputs from the eighth F/F 38. Therefore, the seventh F/F 37 outputs H coefficients delayed two clocks from the time when the H coefficients are supplied to the input terminal $I_H$, and the ninth F/F 39 outputs L coefficients delayed four clocks from the time when the H coefficients are supplied to the input terminal $I_H$.

The first to third select switches 41 to 43 are provided with two input terminals, 0 and 1, and one output terminal. According to a "selector" signal supplied, it selects either the input terminal 0 or 1 for reception of data, and delivers data thus received at the selected input terminal at the output terminal.

The first select switch 41 is supplied at the input terminal 0 thereof with H coefficients delivered at the input terminal $I_H$. Say, the first select switch 41 is supplied with H coefficient received at the input terminal $I_H$ of the transfer block 16 without any delay. The first select switch 41 is supplied at the input terminal 1 thereof with L coefficient output from the first F/F 31. That is, the first select switch 41 is supplied with the L coefficient delayed one clock from the time when the L coefficient is supplied to the input terminal $I_L$. Data delivered at the output terminal of the first select switch 41 is supplied to the horizontal wavelet transform block 12 at the input terminal $I_1$ via the output terminal $O_{11}$.

The second select switch 42 is supplied at the input terminal 0 thereof with H coefficient output from the seventh F/F 37. Namely, the second select switch 42 is supplied with H coefficient delayed two clocks from the time when the H coefficient is supplied to the input terminal $I_L$. The second select switch 42 is supplied at the input terminal 1 thereof with L coefficient output from the third F/F 33. That is, the second select switch 42 is supplied at the terminal 1 thereof with the L coefficient output from the third F/F 33. Say, the second select switch 42 is supplied with L coefficient delayed three clocks from the time when the L coefficient is supplied to the input terminal $I_L$. Data delivered at the output terminal of the second select switch 42 is supplied to the horizontal wavelet transform block 12 at the input terminal $I_2$ via the output terminal $O_{12}$.

The third select switch 43 is supplied at the input terminal 0 thereof with H coefficient output from the ninth F/F 39. Say, the third select switch 43 is supplied with H coefficient delayed four clocks from the time when the H coefficient is supplied to the input terminal IL. The third select switch 43 is supplied at the input terminal 1 thereof with L coefficient output from the fifth F/F 35. That is, the third select switch 43 is supplied with the L coefficient delayed five clocks from the time when the L coefficient is supplied to the input terminal $I_L$. Data delivered at the output terminal of the third select switch 43 is supplied to the horizontal wavelet transform block 12 at the input terminal $I_3$ via the output terminal $O_{13}$.

Figure 24:
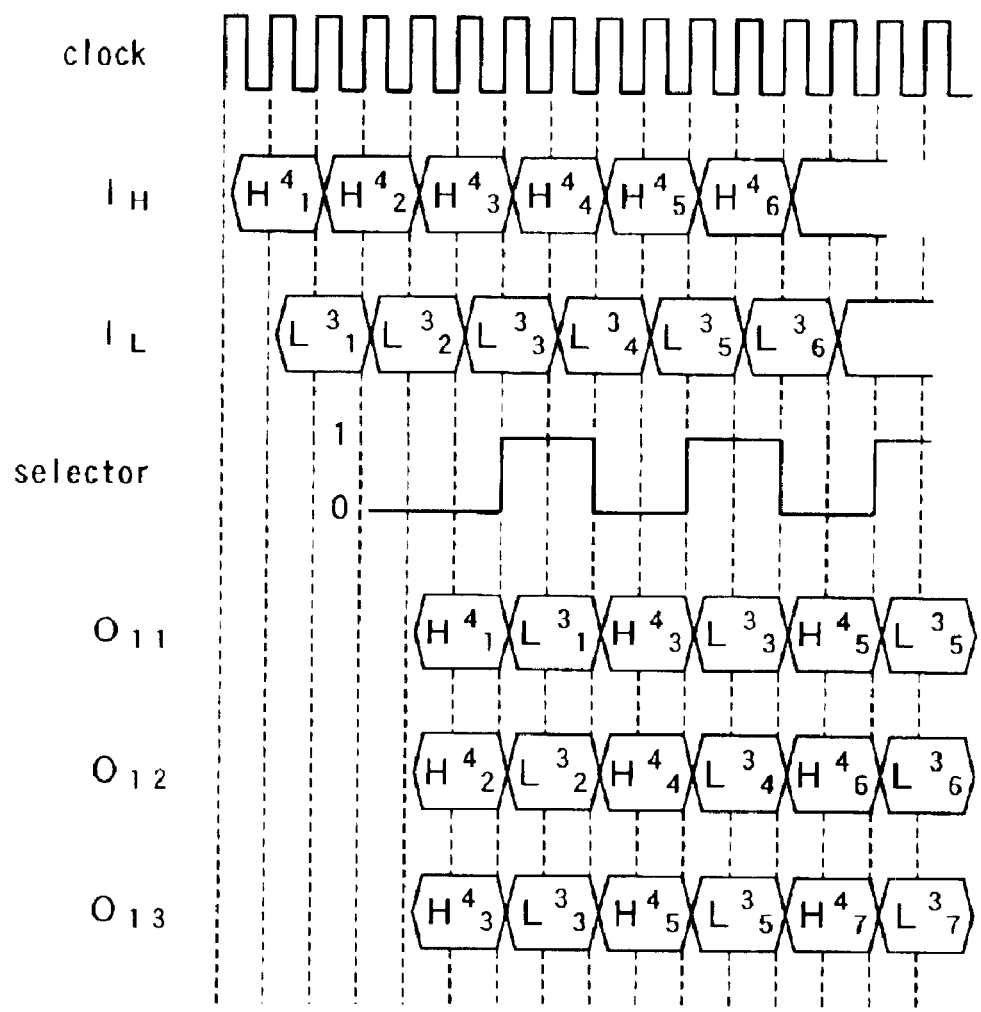
FIG. 24 shows the data input/output timing of the transfer block.

FIG. 24 shows an input timing of L and H coefficients supplied to the transfer block 16, select timing of the "selector" signal, and output timing of the LL, LH, HL and HH coefficients from the transfer block 16. As shown in FIG.

24, the "selector" signal becomes High and Low alternately at every two clocks. When the "selector" signal is High, the first to third select switches 41 to 43 are placed at the "terminal 1", while they are placed at the "terminal 0" when the "selector" signal is Low. As a result, three horizontally successive L coefficients and three vertically successive H coefficients are delivered at the output terminals $O_{11}$, $O_{12}$ and $O_{13}$ alternately at every two clocks. Also, H and L coefficients are delivered at the output terminals $O_{11}$, $O_{12}$ and $O_{13}$ while being slid two steps horizontally.

Functional Description of the Two-Dimensional Wavelet Transformer 10

As having been described in the foregoing, the two-dimensional wavelet transformer 10 according to the present invention include the vertical wavelet transform block 11 and the horizontal wavelet transform block 12.

The vertical wavelet transform block 11 is supplied with original image data P so that pixels are horizontally outputted one by one. That is, the vertical wavelet transform block 11 filters the original image data P vertically while scanning them horizontally. Also, the horizontal wavelet transform block 12 filers the L and H coefficients horizontally while scanning them horizontally, and filters the L and H coefficients alternately once.

As a result, the two-dimensional wavelet transformer 10 has not to include any large-capacity memory between the vertical and horizontal wavelet transform blocks 11 and 12, which leads to a reduced circuit scale thereof. Further, since the two-dimensional wavelet transformer 10 makes the vertical and horizontal wavelet transform operations in parallel, it can make the transform at a higher speed.

Also, the vertical wavelet transform block 11 includes the horizontal line feedback buffer 14 but since it transforms once with two clocks, so read from and write to the horizontal line feedback buffer 14 can be done alternately with each clock. Therefore, the horizontal line feedback buffer 14 can be formed from a single-port type memory, not from a so-called dual-port type one.

Extended Wavelet Transform Systems

Next, there will be explained extended wavelet transform systems in which the two-dimensional wavelet transformer 10 breaks the frequency band into subbands recurrently.

Figure 25:
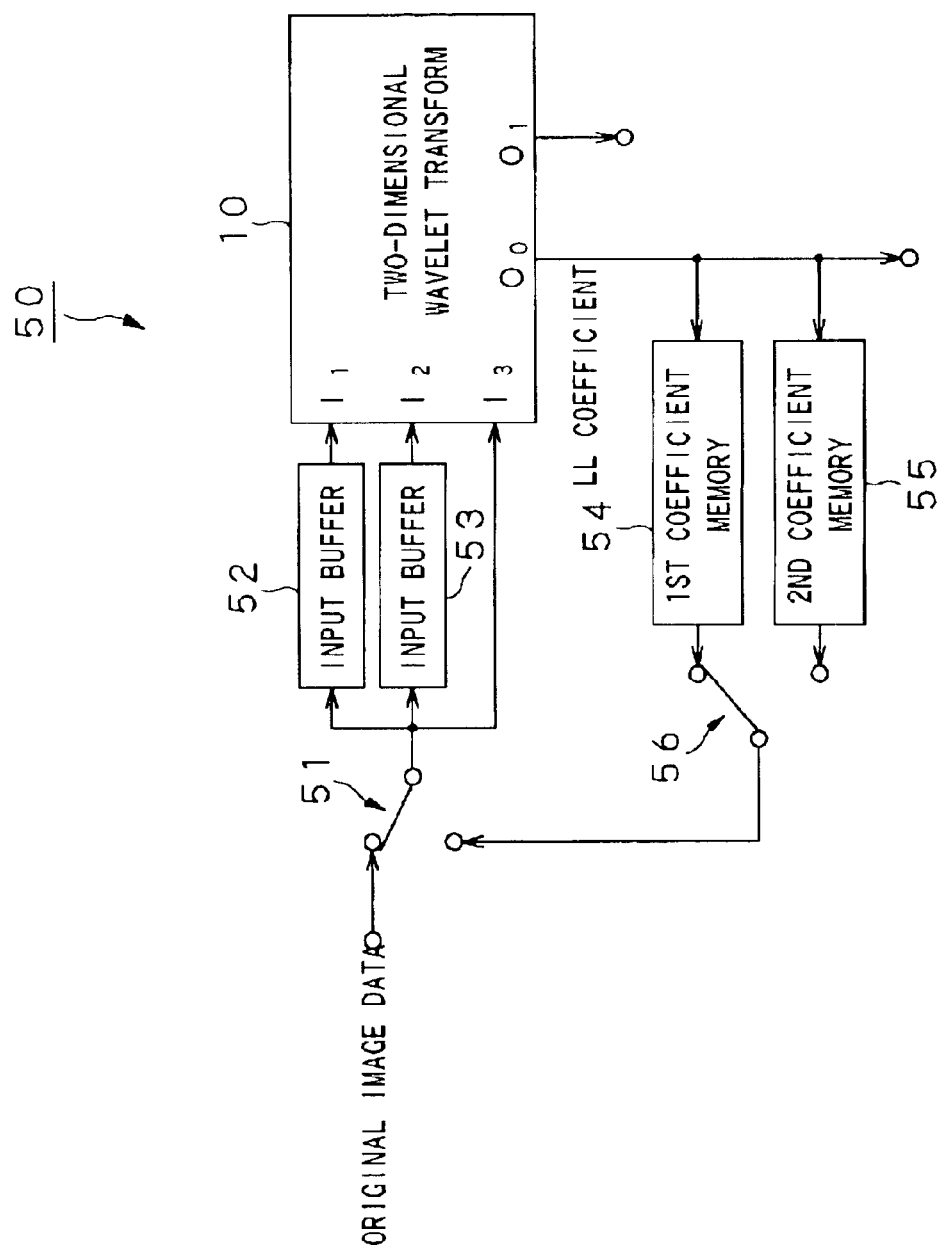
FIG. 25 is a block diagram of a first extended wavelet transform system.

FIG. 25 is a block diagram of the first extended wavelet transform system.

The first extended wavelet transform system is generally indicated with a reference 50. As shown in FIG. 25, it includes the aforementioned two-dimensional wavelet transformer 10, an input select switch 51, first input buffer 52, second input buffer 53, first coefficient memory 54, second coefficient memory 55 and a memory select switch 56.

The input select switch 51 is provided to make a selection between original image data P supplied from outside and an LL coefficient to be filtered during recurrent separation of a frequency band.

The first input buffer 52 holds data for supply to the input terminal $I_1$ of the two-dimensional wavelet transformer 10 for one horizontal line.

The second input buffer 53 holds data for supply to the input terminal $I_2$ of the two-dimensional wavelet transformer 10 for one horizontal line.

The first and second coefficient memories 54 and 55 hold the LL coefficient output from the two-dimensional wavelet transformer 10. The first coefficient memory 54 holds odd-numbered horizontal lines of data in the LL coefficient, while the second coefficient memory 55 holds even-numbered horizontal lines of data in the LL coefficient.

The memory select switch 56 makes a selection between the first and second coefficient memories 54 and 55.

The first extended wavelet transform system 50 constructed as above functions as will be described below:

In the first extended wavelet transform system 50, a first wavelet transform is done as follows. The input select switch 51 is placed at the "original image data P" of which each horizontal line will thus be supplied to the system 50. The first and second input buffers 52 and 53 control the data input timing so that three lines of the original image data P are supplied one after another to the two-dimensional wavelet transformer 10.

Of the coefficients supplied from the two-dimensional wavelet transformer 10, LL coefficient delivered at the output terminal $O_0$ of the horizontal wavelet transform block 12 is supplied to the first and second coefficient memories 54 and 55. The first coefficient memory 54 is supplied with odd-numbered horizontal lines of data of the LL coefficient, while the second coefficient memory 55 is supplied with even-numbered horizontal lines of data of the LL coefficient. That is to say, the first and second coefficient memories 54 and 55 are alternately selected at every horizontal line.

The first extended wavelet transform system 50 proceeds to a second wavelet transform after completion of the first wavelet transform.

The input select switch 51 is placed at the "LL coefficient" so that the LL coefficients stored in the coefficient memories 54 and 55 will be supplied at every horizontal line. At this time, the odd- and even-numbered lines are alternately read from the coefficient memories 54 and 55 at every line correspondingly to the setting of the memory select switch 56. The first and second input buffers 52 and 53 control the data input timing so that three lines of the LL coefficients will be supplied one after another to the two-dimensional wavelet transformer 10.

During the second wavelet transform, the LL coefficients delivered at the output terminal $O_0$ of the horizontal wavelet transform block 12 are outputted when odd-numbered lines are being read from the first coefficient memory 54. Therefore, the LL coefficients having been outputted at the time of the second wavelet transform are supplied to the second coefficient memory 55.

Further, for a third wavelet transform, LL coefficients are read from the second coefficient memory 55 and the output LL coefficients are stored into the first coefficient memory 54.

Since the first extended wavelet transform system includes the two memories for storage of the LL coefficients, it is possible to make a selection between a memory to which the LL coefficients are to be written and a memory from which the LL coefficients are to be read, when recurrently separating the frequency band. Thus, the first extended wavelet transform system may use a single-port memory as the coefficient memory to hold the result of operation when recurrently separating the frequency band, and so can be produced at a lower cost.

Figure 26:
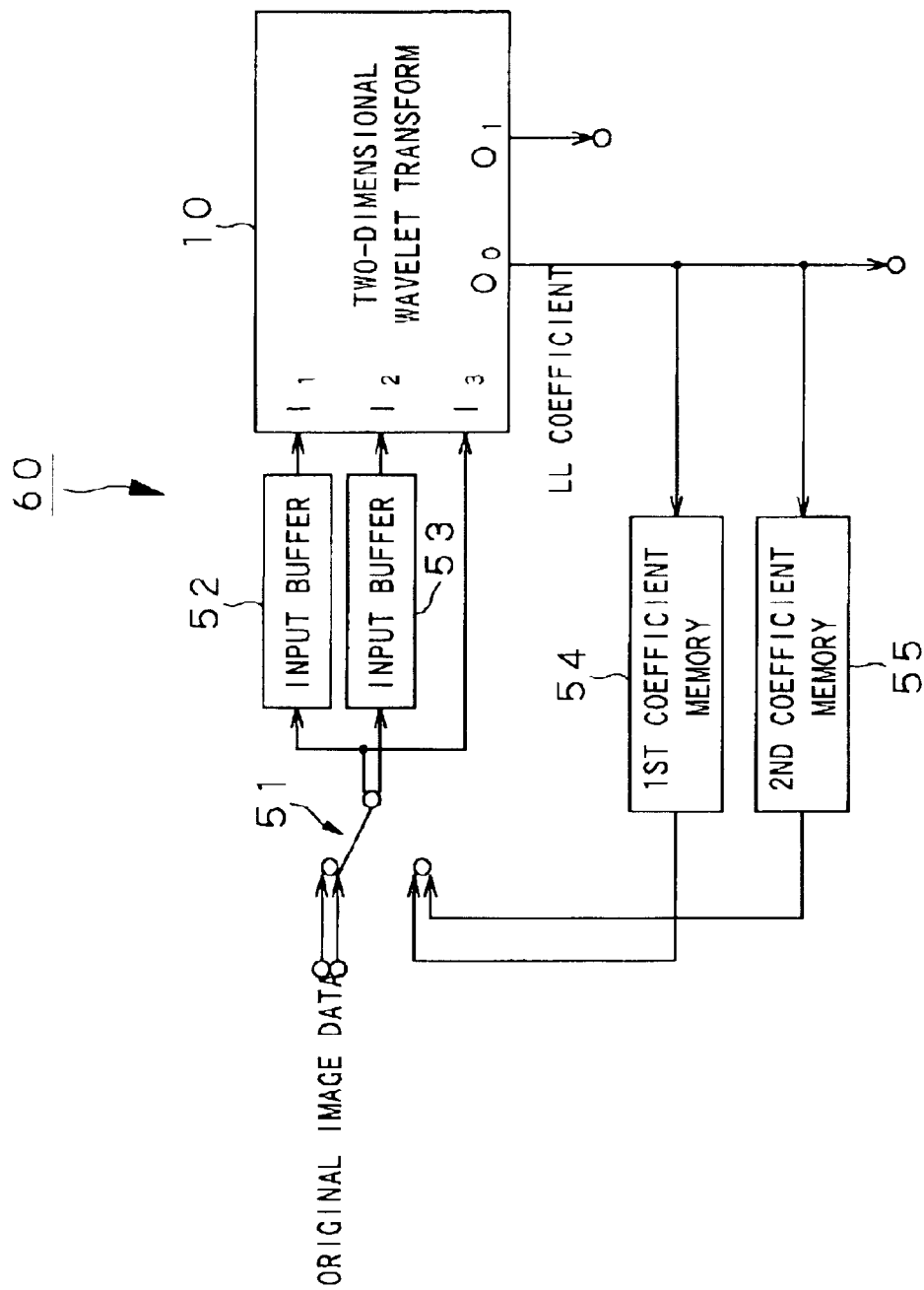
FIG. 26 is a block diagram of a second extended wavelet transform system.

FIG. 26 is a block diagram of the second extended wavelet transform system. The second extended wavelet transform system is generally indicated with a reference 60.

As shown in FIG. 26, the second extended wavelet transform system 60 includes the aforementioned two-dimensional wavelet transformer 10, an input select switch 51, first input buffer 52, second input buffer 53, first coefficient memory 54 and a second coefficient memory 55.

The second extended wavelet transform system 60 is different from the aforementioned first extended wavelet transform system 50 in that it is supplied with two horizontal lines at the same time. Since data can be transferred at a higher rate, the second extended wavelet transform system 60 can make a faster wavelet transform than the first system 50. However, even during the second and subsequent recurrent frequency separation, odd-numbered horizontal lines of the LL coefficients are always supplied to the first coefficient memory 54, while even-numbered horizontal liens of the LL coefficients are always supplied to the second coefficient memory 55.

Figure 27:
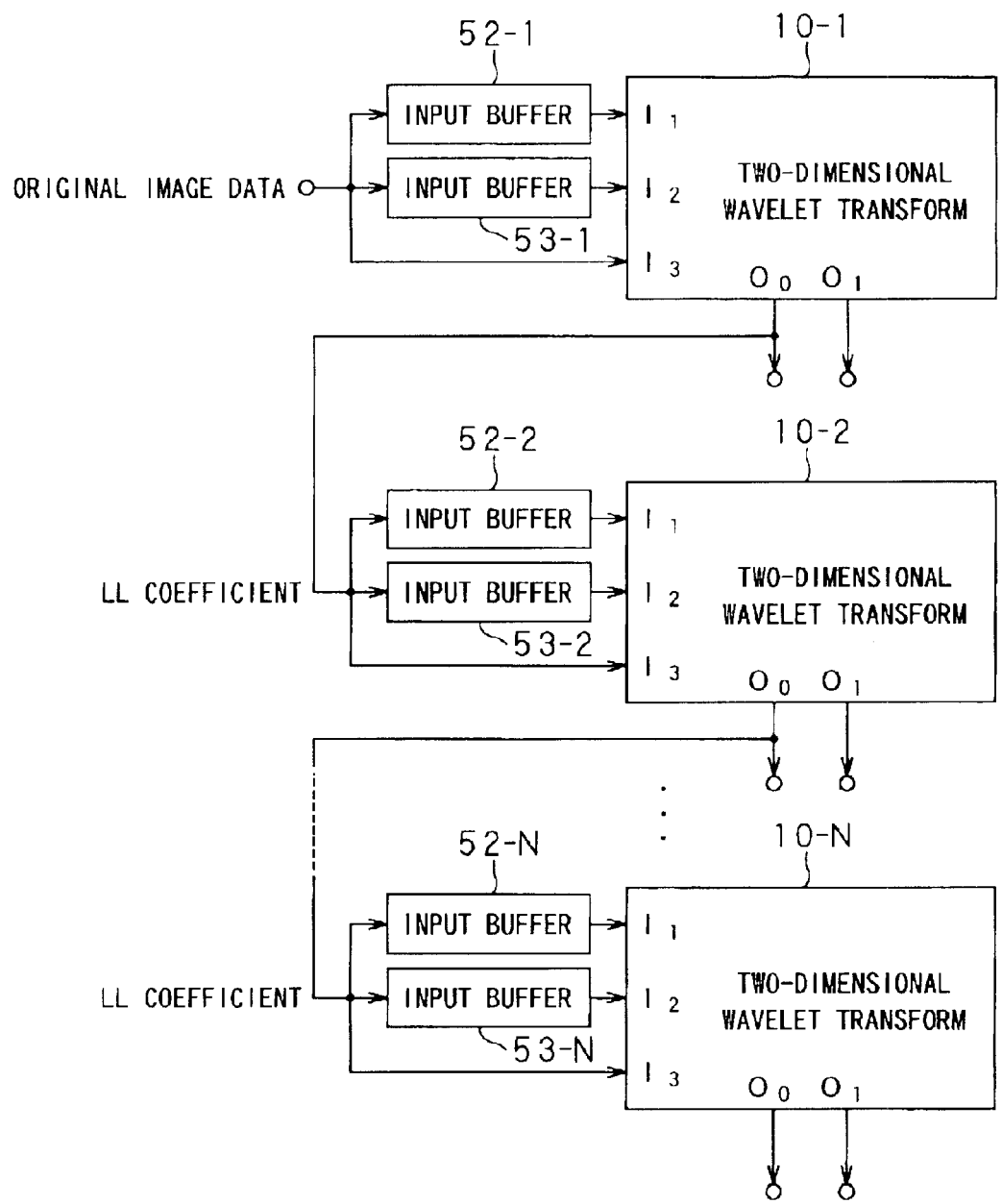
FIG. 27 is a block diagram of a third extended wavelet transform system.

FIG. 27 is a block diagram of the third extended wavelet transform system. The third extended wavelet transform system is generally indicated with a reference 70.

This third extended wavelet transform system 70 can be applied in case a maximum number of recurrent frequency band divisions N (a larger integer than 0) is predetermined.

As shown in FIG. 27, the third extended wavelet transform system 70 includes N two-dimensional wavelet transformers 10-1 to 10-N constructed identically to the aforementioned two-dimensional wavelet transformer 10, and first input buffers 52-1 to 52-N and second input buffers 53-1 to 53-N, provided in the two-dimensional wavelet transformers 10-1- to 10-N, respectively.

In the third extended wavelet transform system 70, the two-dimensional wavelet transformers 10-1 to 10-N are connected in series to each other.

That is, the first two-dimensional wavelet transformer 10-1 is supplied with original image data P via the first and second input buffers 52-1 and 53-1, and outputs N(L)=1 transform coefficients.

The second two-dimensional wavelet transformer 10-2 is supplied with LL coefficient from the first two-dimensional wavelet transformer 10-1 via the first and second input buffers 52-2 and 53-2, and outputs N(L)=2 transform coefficients.

Then, the N-th two-dimensional wavelet transformer 10-N is supplied with LL coefficient from the (N−1)th two-dimensional wavelet transformer 10-(N−1) via the first and second input buffers 52-N and 53-N, and outputs N(L)=N transform coefficients.

Since the N two-dimensional wavelet transformers 10 are connected in series to each other as above, so it is possible to recurrently separate the frequency band with having to provide a plurality of memories and do this recurrent frequency band separation in each of the N two-dimensional wavelet transformers 10. Thus, the third extended wavelet transform system 70 can make wavelet transform at a high speed.

Figure 28:
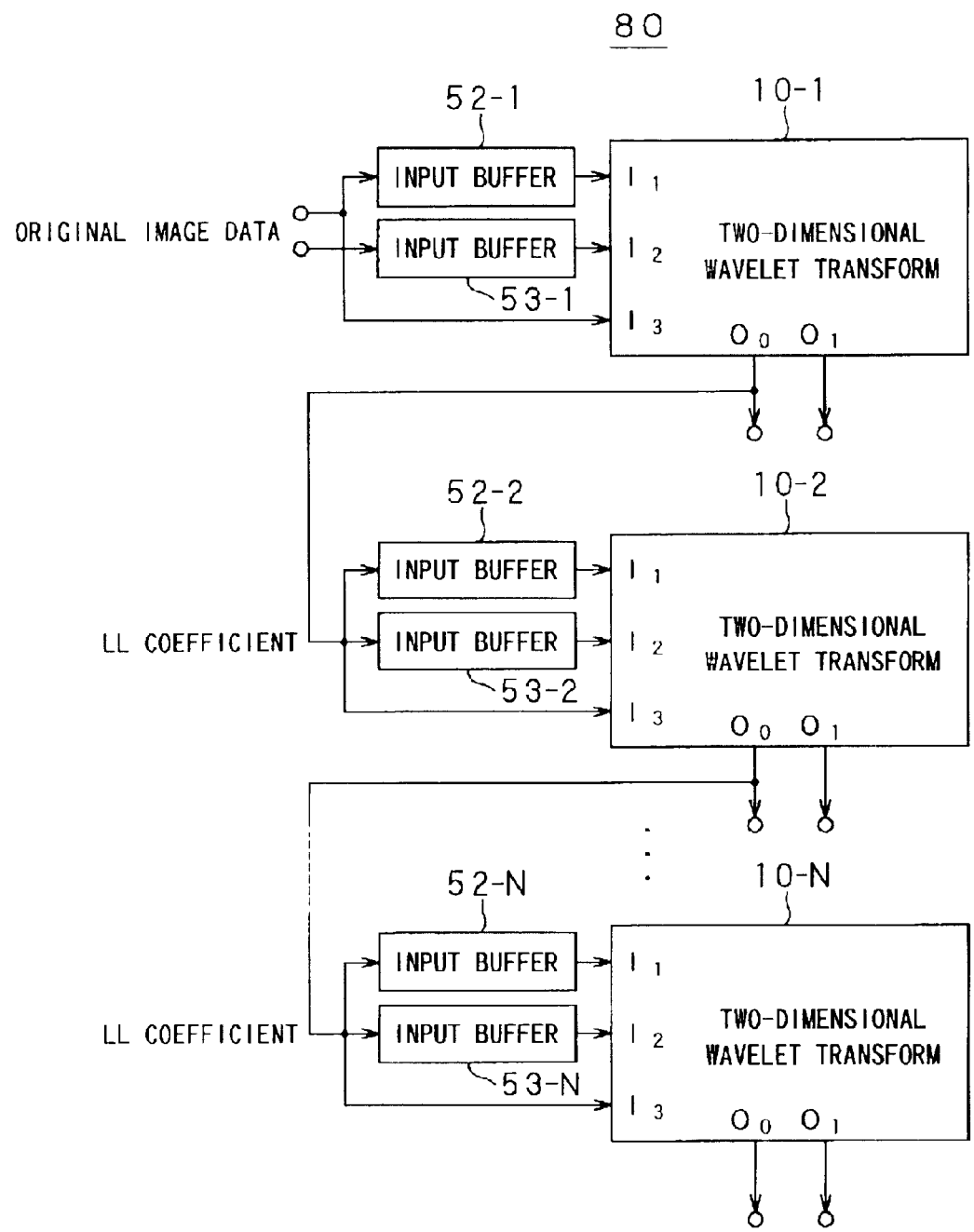
FIG. 28 is a block diagram of a fourth extended wavelet transform system.

FIG. 28 is a block diagram of the fourth extended wavelet transform system. The fourth extended wavelet transform system is generally indicated with a reference 80.

As shown in FIG. 28, the fourth extended wavelet transform system 80 includes N two-dimensional wavelet transformers 10-1 to 10-N constructed identically to the aforementioned two-dimensional wavelet transformer 10, and first input buffers 52-1 to 52-N and second input buffers 53-1 to 53-N, provided in the two-dimensional wavelet transformers 10-1 to 10-N, respectively.

The fourth extended wavelet transform system 80 is different from the aforementioned third extended wavelet transform system 70 in that it is supplied with two horizontal lines of original image data P at the same time. Since data can be transferred at a higher rate, the second extended wavelet transform system 60 can make a faster wavelet transform than the first system 50. In this case, since data can be transferred at a high speed, the fourth extended wavelet transform system 80 can make wavelet transform at a higher speed than the third extended wavelet transform system 70.

In the foregoing, the first to fourth extended wavelet transform systems 50 to 80 have been explained. To attain the above object, the first and third extended wavelet transform systems 50 and 70 may be combined or the second and fourth extended wavelet transform systems 60 and 80 may be combined, for example. That is to say, an extended wavelet transform system may be built by connecting a plurality of the two-dimensional wavelet transformers 10 in series with each other in such a manner that LL coefficient output from the last one of the series-connected two-dimensional wavelet transformers 10 is fed back to the first one of the two-dimensional wavelet transformers 10.

As having been described in the foregoing, in the two-dimensional subband coding equipment, the X-directional subband transform means makes X-directional subband transform of original data arrayed two-dimensionally, namely, in the X and Y directions, and the Y-directional subband transform means makes Y-directional subband transform of the original data, thereby providing a two-dimensional subband transform.

The X-directional subband transform means is supplied with two-dimensionally arrayed original data such that a data string of X-directional low-frequency band data and a data string of Y-directional low-frequency band data are sequentially outputted in the Y direction.

Further in the two-dimensional subband coding equipment according to the present invention, the Y-directional subband transform means makes Y-directional subband transform of the X-directional low-frequency band data and Y-directional subband transform of the X-directional high-frequency band data.

The Y-directional subband transform means is supplied with a data string of X-directional low-frequency band data and a data string of Y-directional high-frequency band data in the output sequence of the X-directional subband transform means, that is, in the Y direction. Also, the Y-directional subband transform means makes subband transform of both the X-directional low- and high-frequency band data. It makes subband transform of the X-directional low-frequency band data and subband transform of the Y-directional low-frequency band data alternately.

Thus, in the two-dimensional subband coding equipment according to the present invention, data output from the X-directional subband transform means is transformed by the Y-directional subband transform means in the output sequence of the X-directional subband transform means. Therefore, no memory to hold two-dimensionally arrayed data has to be provided between the X- and Y-directional subband transform means, and the transform itself can be done in a reduced time.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. A two-dimensional subband coding equipment which separates original data two-dimensionally arrayed in two directions, namely, in X and Y directions, into X- and Y-directional low- and high-frequency band component subbands, the equipment comprising:

an X-directional subband transform means for calculating X-directional low-frequency band data that are X-directional low-frequency band components of the two-dimensionally arrayed original data and X-directional high-frequency band data that are X-directional high-frequency band components of the two-dimensionally arrayed original data to provide two-dimensionally arrayed X-directional low- and high-frequency band data;

a Y-directional subband transform means for calculating X- and Y-directional low-frequency band data that are Y-directional low-frequency band components of the two-dimensionally arrayed X-directional low-frequency band data, X-directional low-frequency band and Y-directional high-frequency band data that are Y-directional high-frequency band components of the two-dimensionally arrayed X-directional low-frequency band data, X-directional high-frequency band and Y-directional low-frequency band data that are Y-directional low-frequency band components of the two-dimensionally arrayed high-frequency band data, and X- and Y-directional high-frequency band data that are Y-directional high-frequency band components of the two-dimensionally arrayed X-directional high-frequency band data to provide two-dimensionally arrayed X- and Y-directional low-frequency band data, X-directional low-frequency band and Y-directional high-frequency band data, X-directional high-frequency band and Y-directional low-frequency band data, and X- and Y-directional high-frequency band data; and a control means which controls data to be supplied to the X-directional subband transform means and Y-directional subband transform means;

the X-directional subband transform means being supplied, for each transform, with a predetermined number of original data arrayed in the X direction in the two-dimensional array, and calculating one X-directional low-frequency band data and one X-directional high-frequency band data on the basis of the supplied predetermined number of X-directionally arrayed original data;

the Y-directional subband transform means being supplied, for each transform, with a predetermined number of X-directional low- or high-frequency band data, arrayed in the Y direction in the two-dimensional array, and calculating one X- and Y-directional low-frequency band data and one X-directional low-frequency band and Y-directional high-frequency band data on the basis of the supplied predetermined number of Y-directionally arrayed X-directional low-frequency band data, and also one X-directional high-frequency band and Y-directional low-frequency band data and one X- and Y-directional high-frequency band data on the basis of the supplied predetermined number of Y-directionally arrayed X-directional high-frequency band data;

the control means supplying the predetermined number of original data to the X-directional subband transform means in the Y-direction; and also, the control means supplying the predetermined number of Y-directionally arrayed X-directional low-frequency band data and predetermined number of Y-directionally arrayed X-directional high-frequency band data to the Y-directional subband transform means in the output sequence of the X-directional subband transform means, and also the X-directional low- and high-frequency band data alternately to the Y-directional subband transform means at each transform by the Y-directional subband transform means.

2. The equipment as set forth in claim 1, wherein:

the X- and Y-directional subband transform means make a five-by-three lifting wavelet transform; and the control means includes:

an X-line buffer which holds the X-directional high-frequency band data output from the X-directional subband transform means for one Y-directional line; and a Y-directional high-frequency band data buffer which holds one of the X-directional low-frequency band and Y-directional high-frequency band data and one of the X- and Y-directional high-frequency band data, supplied from the Y-directional subband transform means;

the control means supplying X-directionally arrayed three original data to the X-directional subband transform means, while reading, from the X-line buffer, X-directional high-frequency band data having been outputted one Y-directional line before and supplying the data to the X-directional subband transform means;

the control means shifting the X-directionally arrayed three data by two data in the X direction after outputting the X-directional low- and high-frequency band data each for one Y-directional line, and supplying the thus shifted data to the X-directional subband transform means;

the control means supplying Y-directionally arrayed three X-directional low-frequency band data to the Y-directional subband transform means, while reading one-data-previous X-directional low-frequency band and Y-directional high-frequency band data from the Y-directional high-frequency band data buffer and supplying the data to the Y-directional subband transform means and supplying Y-directionally arrayed three X-directional high-frequency band data, while reading one-data-previous X- and Y-directional high-frequency band data from the Y-directional high-frequency band data buffer and supplying the data to the Y-directional subband transform means; and also, the control means shifting the X-directional low- and high-frequency band data, supplied from the X-directional subband transform means, by two data in the Y direction at every three data and supplying the thus shifted data to the Y-directional subband transform means.

3. The equipment as set forth in claim 1, further comprising a low-frequency band data storage means which holds two-dimensionally arrayed X- and Y-directional low-frequency band data supplied from the Y-directional subband transform means;

the control means supplying, for a first two-dimensional subband encoding in the recurrent two-dimensional subband encoding, input original data to the X-directional subband transform means, and for a second and subsequent two-dimensional subband encoding, the two-dimensionally arrayed X- and Y-directional low-frequency band data as the original data to the X-directional subband transform means.

4. The equipment as set forth in claim 3, wherein the low-frequency band data storage means includes:

a first storage means which holds X- and Y-directional low-frequency band data in odd-numbered lines of Y-directional lines; and a second storage means which holds X- and Y-directional low-frequency band data in even-numbered lines of the Y-directional lines.

* * * * *